US012472685B2

(12) United States Patent
Nishida et al.

(10) Patent No.: US 12,472,685 B2
(45) Date of Patent: Nov. 18, 2025

(54) THREE-DIMENSIONAL FABRICATION AT INERT IMMISCIBLE LIQUID INTERFACE

(71) Applicant: University of Florida Research FOundation, Incorporated, Gainesville, FL (US)

(72) Inventors: Toshikazu Nishida, Gainesville, FL (US); Aftab A. Bhanvadia, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 390 days.

(21) Appl. No.: 16/763,724

(22) PCT Filed: Jan. 11, 2019

(86) PCT No.: PCT/US2019/013154
§ 371 (c)(1),
(2) Date: May 13, 2020

(87) PCT Pub. No.: WO2019/140160
PCT Pub. Date: Jul. 18, 2019

(65) Prior Publication Data
US 2020/0324466 A1    Oct. 15, 2020

Related U.S. Application Data

(60) Provisional application No. 62/616,655, filed on Jan. 12, 2018.

(51) Int. Cl.
*B29C 64/135*    (2017.01)
*B29C 64/124*    (2017.01)
(Continued)

(52) U.S. Cl.
CPC .......... *B29C 64/135* (2017.08); *B29C 64/255* (2017.08); *B33Y 10/00* (2014.12);
(Continued)

(58) Field of Classification Search
CPC ......... B33Y 10/00; B33Y 30/00; B33Y 70/00; B33Y 80/00; B29C 64/112; B29C 64/124;
(Continued)

(56) References Cited

U.S. PATENT DOCUMENTS 5,122,441 A * 6/1992 Lawton .................. B33Y 10/00
430/394
5,639,413 A * 6/1997 Crivello ................ G03F 7/0757
264/401
(Continued)

FOREIGN PATENT DOCUMENTS

CA          3024147 A1    12/2017
WO    WO-2014/126830 A2    8/2014
(Continued)

OTHER PUBLICATIONS

Walker, David A. et al. *Rapid, Large-Volume Thermally Controlled 3D Printing Using A Mobile Liquid Interface*, Science, vol. 366, Issue 6463, Oct. 18, 2019, pp. 360-364, DOI: 10.1126/science.aax1562.
(Continued)

*Primary Examiner* — Seyed Masoud Malekzadeh
(74) *Attorney, Agent, or Firm* — ALSTON & BIRD LLP

(57) ABSTRACT

A method and device of polymerization to form 3D objects is provided. The method and device incorporate an inert immiscible liquid between a liquid monomer and a light source such that the liquid monomer is polymerized when exposed to polymerization light from the light source at a
(Continued)

liquid monomer-inert immiscible liquid interface. The liquid monomer is polymerized into a solid polymer that forms the 3D object.

30 Claims, 20 Drawing Sheets

(51) Int. Cl.
*B29C 64/255* (2017.01)
*B33Y 10/00* (2015.01)
*B33Y 30/00* (2015.01)
*B33Y 40/10* (2020.01)
*B29K 105/00* (2006.01)

(52) U.S. Cl.
CPC .............. *B33Y 30/00* (2014.12); *B33Y 40/10* (2020.01); *B29C 64/124* (2017.08); *B29K 2105/0002* (2013.01)

(58) Field of Classification Search
CPC ... B29C 64/129; B29C 64/135; B29C 64/245; B29C 64/00; B29C 64/255; B29C 64/40; B29K 2995/0073; C08G 59/306; C08G 59/3254; G03F 7/0037; G03F 7/027; G03F 7/075; G03F 7/0755; G03F 7/0757
See application file for complete search history.

(56) References Cited

U.S. PATENT DOCUMENTS

| | | | | |
|---|---|---|---|---|
| 9,205,601 | B2* | 12/2015 | DeSimone | G03F 7/0037 |
| 9,360,757 | B2* | 6/2016 | DeSimone | B29C 64/295 |
| 10,144,181 | B2* | 12/2018 | DeSimone | B29C 64/129 |
| 10,150,280 | B2* | 12/2018 | Aghababaie | B29C 64/241 |
| 10,166,725 | B2* | 1/2019 | Willis | B29C 64/106 |
| 10,213,956 | B2* | 2/2019 | Willis | B29C 64/277 |
| 10,232,552 | B2† | 3/2019 | Baltaji | |
| 10,245,785 | B2* | 4/2019 | Adzima | B29C 64/135 |
| 10,259,171 | B2* | 4/2019 | Robeson | B29C 64/124 |
| 10,434,706 | B2* | 10/2019 | Robeson | B29C 64/124 |
| 10,538,030 | B2* | 1/2020 | DeSimone | B33Y 10/00 |
| 11,141,910 | B2* | 10/2021 | DeSimone | B29C 64/393 |
| RE49,180 | E* | 8/2022 | Robeson | B29C 64/124 |
| 11,400,650 | B2* | 8/2022 | Adzima | B29C 31/047 |
| 2016/0046075 | A1 | 2/2016 | DeSimone et al. | |
| 2016/0059487 | A1* | 3/2016 | DeSimone | B33Y 80/00 425/162 |
| 2016/0325493 | A1* | 11/2016 | DeSimone | B29C 39/26 |
| 2017/0028618 | A1* | 2/2017 | Robeson | B29C 64/129 |
| 2017/0113416 | A1* | 4/2017 | DeSimone | B29C 64/129 |
| 2017/0129167 | A1* | 5/2017 | Castanon | B33Y 30/00 |
| 2017/0173881 | A1* | 6/2017 | Dachs, II | B29C 64/129 |
| 2017/0210077 | A1* | 7/2017 | Ermoshkin | B29C 64/40 |
| 2017/0291357 | A1* | 10/2017 | Fong | B29C 64/00 |
| 2018/0029292 | A1* | 2/2018 | Samulski | B29C 64/393 |
| 2018/0071976 | A1* | 3/2018 | Tumbleston | B29C 64/124 |
| 2018/0126644 | A1* | 5/2018 | Slaczka | B32B 25/04 |
| 2018/0141268 | A1* | 5/2018 | Holt | G03F 7/029 |
| 2019/0337222 | A1* | 11/2019 | Gu | C08G 18/10 |
| 2021/0114288 | A1 | 4/2021 | Mirkin et al. | |

FOREIGN PATENT DOCUMENTS

| | | |
|---|---|---|
| WO | WO-2016/149097 A1 | 9/2016 |
| WO | WO-2017/112483 A2 | 6/2017 |

OTHER PUBLICATIONS

International Searching Authority, International Search Report and Written Opinion for International Application No. PCT/US2019/013154, Apr. 15, 2019, (9 pages), U.S. Patent and Trademark Office, USA.

Chittofrati A. et al. *Perfluoropolyether Microemulsions*, Progress In Colloid & Polymer Science, vol. 79, pp. 218-225, (1989). DOI: 10.1007/BFb0116212.

\* cited by examiner
† cited by third party

THREE-DIMENSIONAL FABRICATION AT INERT IMMISCIBLE LIQUID INTERFACE

CROSS-REFERENCE TO RELATED PATENT APPLICATIONS

This application is a national stage application filed under 35 U.S.C. § 371 of International Application No. PCT/US2019/013154 with an international filing date of Jan. 11, 2019, which claims priority to and the benefit of U.S. Provisional Patent Application Ser. No. 62/616,655, entitled "Continuous Polymerization at Liquid Dead Layer Interface" and filed on Jan. 12, 2018, the entire contents of each of which are hereby incorporated by reference.

BACKGROUND

Traditional ultra violet (UV) curable polymer based additive manufacturing is enabled by polymerization of a liquid monomer into a solid polymer when exposed to directed or patterned UV light. This process may be repeated to achieve layer by layer growth, where each layer has a discrete thickness. After the formation of each layer, stiction may occur between the solid polymer and the transparent solid boundary disposed between the solid polymer and UV light source. Applicant has identified a number of deficiencies and problems associated with conventional additive manufacturing. Through applied effort, ingenuity, and innovation, many of these identified problems have been solved by developing solutions that are included in embodiments of the present invention, many examples of which are described in detail herein.

BRIEF SUMMARY

Embodiments of the subject invention provide novel and advantageous methods of polymerization and devices for polymerization that overcome stiction between a solid polymer and a solid boundary by introducing an inert immiscible liquid.

Provided herein is a device for polymerization to form a three-dimensional (3D) object, the device including an inert immiscible liquid disposed in a containment vessel and a liquid monomer disposed adjacent to the inert immiscible liquid. The device is configured such that light from a light source polymerizes the liquid monomer to a solid polymer at a liquid monomer-inert immiscible liquid interface formed between the liquid monomer and the inert immiscible liquid. For instance, in some embodiments, the device is configured such that an internal or external light source is disposed adjacent to the inert immiscible liquid such that light emitting from the light source passes through the inert immiscible liquid prior to contacting the liquid monomer. The inert immiscible liquid may be transparent to the polymerization light emitting from the light source. The device may include a transparent solid boundary such that the inert immiscible liquid is disposed between the transparent solid boundary and the liquid monomer and polymerization of the liquid monomer occurs at the liquid monomer-inert immiscible liquid interface. The inert immiscible liquid may be designed to be inert to polymerization when exposed to the polymerization light and may be designed to include additives to modify the polymerization of the liquid monomer occurring at the liquid monomer-inert immiscible liquid interface. For instance, in some embodiments, additives may be added and operate as one of the reactants in the polymerization process. In some embodiments, additives may increase or decrease the rate of reaction or otherwise modify the polymerization of the liquid monomer.

The device may include a membrane within the inert immiscible liquid. In some embodiments, the membrane may be added to control the height of the inert immiscible liquid though polymerization of the liquid monomer occurs at the liquid monomer-inert immiscible liquid interface. The membrane is generally a solid that may be flexible, permeable, and/or porous. In some embodiments, the membrane may have liquid on both sides of the membrane due to the permeable or porous nature of the membrane. In some embodiments, the membrane may operate as a patterned photomask. In some embodiments, the membrane may improve the heat transfer between components of the device. For instance, if the inert immiscible liquid may be maintained at a certain temperature above and below the membrane due to the thin nature of the membrane in some embodiments. In some embodiments, the membrane may also prevent large disturbances (e.g., fluidic flow (waves) or viscous flow) to the liquid monomer-inert immiscible liquid interface.

The device may not include an intervening material between the inert immiscible liquid and the liquid monomer to be polymerized. The inert immiscible liquid may be heated such that the liquid monomer is polymerized at the liquid monomer-inert immiscible liquid interface. For instance, the inert immiscible liquid may be locally heated to form a liquid phase of inert immiscible liquid such that when exposed to polymerization light, the liquid monomer polymerizes at a liquid-liquid interface. In some embodiments, heat may be used to initiate polymerization and/or modify the polymerization (e.g., modify the rate of polymerization). Heat may be used to change the miscibility of the inert immiscible liquid and the liquid monomer. Heat may also help control other fluidic properties of the inert immiscible liquid and liquid monomer, such as viscosity, surface tension, and interfacial forces between the liquid monomer and the inert immiscible liquid. Similarly, cooling may be used to modify the properties of the inert immiscible liquid and liquid monomer, interaction of these components, and the polymerization of the liquid monomer. The liquid monomer and inert immiscible liquid may be chosen such that the density of the inert immiscible liquid keeps the inert immiscible liquid disposed between the liquid monomer and a light source.

Embodiments are provided herein directed to a device for additive manufacturing to form a 3D object. The device includes an inert immiscible liquid disposed in a containment vessel; and a liquid monomer disposed adjacent to the inert immiscible liquid. The device is configured such that polymerization light from a light source polymerizes the liquid monomer to form a solid polymer at a liquid monomer-inert immiscible liquid interface formed between the liquid monomer and the inert immiscible liquid. In some embodiments, the inert immiscible liquid may be transparent to the light. In some embodiments, the containment vessel may be a solid boundary and the inert immiscible liquid may be disposed between the solid boundary and the liquid monomer on at least a portion of the containment vessel. In some embodiments, the containment vessel may include a substrate disposed in the containment vessel such that the liquid monomer forms the solid polymer over the substrate when exposed to light from the light source. In some embodiments, a density of the inert immiscible liquid may be different than a density of the liquid monomer. In some embodiments, the solid boundary may be a patterned photomask, liquid crystal display (LCD), light-emitting diode (LED), transparent solid boundary, or combinations thereof.

In some embodiments, the polymerization of the liquid monomer may be spatially controlled so that a portion of the liquid monomer is polymerized to the solid polymer.

In some embodiments, the device may include a membrane disposed between at least part of the inert immiscible liquid and the liquid monomer and configured such that polymerization of the liquid monomer occurs at the liquid monomer-inert immiscible liquid interface. The inert immiscible liquid may permeate through the membrane such that polymerization occurs at the liquid monomer-inert immiscible liquid interface.

In some embodiments, the inert immiscible liquid may include one or more additives. The one or more additives may modify polymerization of the liquid monomer, polymerization of the inert immiscible liquid, or both. In some embodiments, the one or more additives may be incorporated into the solid polymer when the liquid monomer is polymerized to the solid polymer when exposed to light emitted from the light source. In some embodiments, a gradient of miscibility may form at the inert immiscible liquid and liquid monomer. In some embodiments, the inert immiscible liquid may be a different liquid than the liquid monomer. In some embodiments, the inert immiscible liquid may include additives that modify properties of the inert immiscible liquid and the liquid monomer, the interaction between the inert immiscible liquid and the liquid monomer, or combinations thereof. For instance, the additives may modify miscibility, interfacial properties (e.g., surface tension or surface energy), optical properties (e.g., refractive index, scattering, or transmission absorption), fluidic dynamics (e.g., viscosity), electrical properties (e.g., resistivity, dielectric constant), boiling point or vapor pressure, thermal conduction, etc. or combinations thereof of the inert immiscible liquid and the liquid monomer. In some embodiments, the device may include a plurality of inert immiscible liquids.

In some embodiments, the device may include at least one inlet/outlet port defined in the containment vessel, solid boundary, or combinations thereof for introducing and/or draining liquid monomer, inert immiscible liquid, additives, gases, vacuum, or both into the device. In some embodiments, the device may include a heater or cooler disposed in the device to modify a temperature of the inert immiscible liquid, to modify a temperature of the liquid monomer, to modify polymerization of the liquid monomer, or combinations thereof.

Embodiments provided herein are also directed to a method of additive manufacturing to form a 3D object. The method may include exposing a liquid monomer to polymerization light such that the polymerization light initiates polymerization of the liquid monomer to form a solid polymer. The polymerization light may travel through an inert immiscible liquid disposed between the liquid monomer and a light source emitting the light and polymerization may occur at a liquid monomer-inert immiscible liquid interface formed between the liquid monomer and the inert immiscible liquid. In some embodiments, the method may include moving a substrate on which the solid polymer forms away from the light source while exposing the liquid monomer to light such that the polymerization light initiates polymerization of the liquid monomer to form the solid polymer. In some embodiments, the method may include heating the inert immiscible liquid to form a portion of inert immiscible liquid in a liquid phase prior to or while exposing the liquid monomer to light such that the polymerization light initiates polymerization of the liquid monomer to form the solid polymer.

Embodiments provided herein are also directed to 3D objects formed of the disclosed device and method.

BRIEF DESCRIPTION OF DRAWINGS

FIGS. 34(a) and 33(b) show examples of solid polymer prepared in accordance with some embodiments discussed herein;

DETAILED DESCRIPTION

Figure 1:
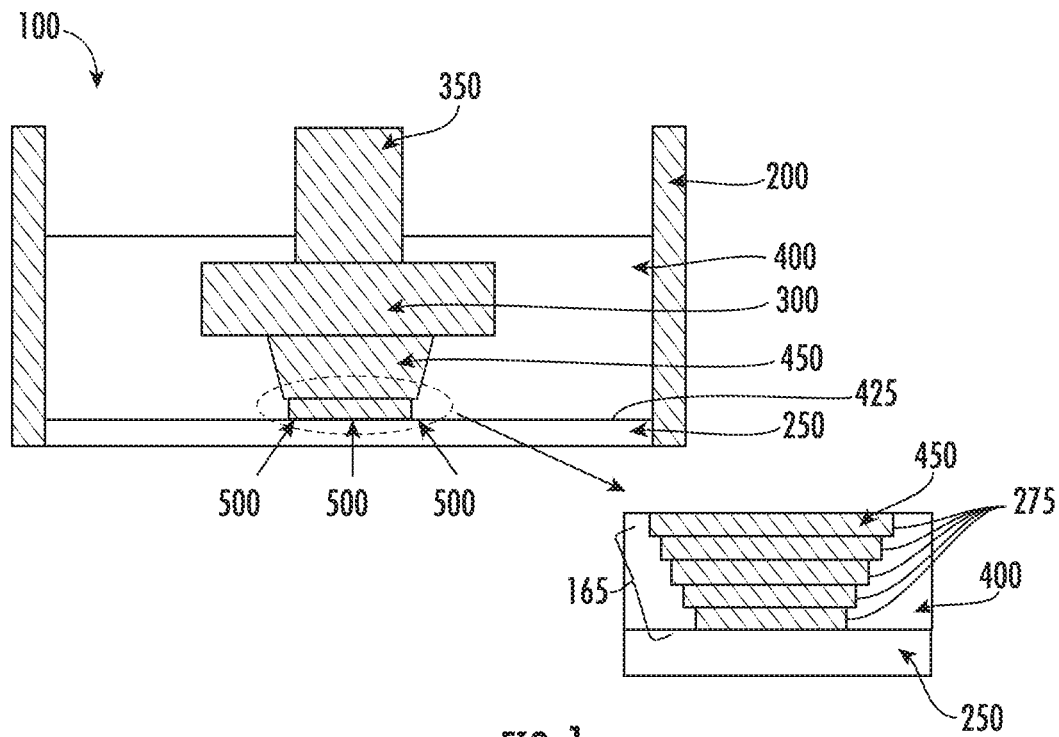
FIG. 1 illustrates a conventional microstereolithography method.

Embodiments of the subject disclosure provide novel and advantageous devices and methods for polymerization. The present device and method incorporates an inert immiscible liquid during polymerization. In some embodiments, the inert immiscible liquid may be disposed between a solid polymer and a solid boundary to prevent stiction between the solid polymer and solid boundary.

As used herein, the term "resin" and "monomer" may be used interchangeably. In some embodiments, a "resin" may be composed of monomer, photoinitiator, dye, absorber, loaded micro/nano particles, any other component desired for polymerization or the resulting 3D object, or combinations thereof. As used herein, a "liquid monomer" will generally be used to refer to the fluid in the containment vessel that is used to form the solid polymer and may include the components listed above for a resin and any other additional component desired for the resulting 3D object. The liquid monomer can include metal, polymer, ceramic, and/or a mixture thereof, such as organic molecules, monomer, or polymer with dispersed metal or ceramic nanoparticles. The liquid monomer may be any suitable composition to form the desired solid polymer from liquid material.

As used herein, the term "polymerization" or "curing" may refer to the process of converting liquid monomer into a "solid polymer." The method may not be limited to creating "polymers" (e.g., "plastics"). The disclosed devices and methods may be used to create any 3D object out of any suitable materials, for example, polymers, metals, ceramics, etc., and combinations thereof. The materials may be modified to prepare the desired object from the desired material. Thus, while the reaction process (e.g., the process of converting a liquid component to a solid component) is generally referred to as polymerization and with reference to a liquid monomer, the disclosed devices and methods may be used to create any 3D object out of any suitable materials, for example, polymers, metals, ceramics, etc., and combinations thereof, and may use liquid forms of these materials and then convert such forms to solid to form the 3D object.

Reference may be made throughout the present disclosure to "UV light" as the light that initiates polymerization. Light may allow for spatially controlling where polymerization occurs. However, light of any wavelength (e.g., narrow or broad spectrum) may be used. That is, the disclosure may be applied to light of any wavelength. Further, the disclosed devices and methods are not limited to only light initiated polymerization. Other catalysts may initiate polymerization, such as heat, oxidants, reductants, etc. For instance, heat may be used to initiate polymerization, though heat may be more difficult to spatially control compared to light leading to lower resolution control than light induced polymerization.

Additive manufacturing (AM) or 3D printing is a process of fabricating 3D objects by sequentially adding materials to the object being built until it reaches its final geometrical form. Each subsequent addition of material to the object is selectively placed in order to make the desired geometrical form of the final 3D object. Because of the ability to fabricate complex 3D objects using additive manufacturing, additive manufacturing is also generally referred to as 3D printing. As used herein, the product resulting from application of the disclosed methods and use of the disclosed devices is generally referred to as the 3D object.

Figure 2:
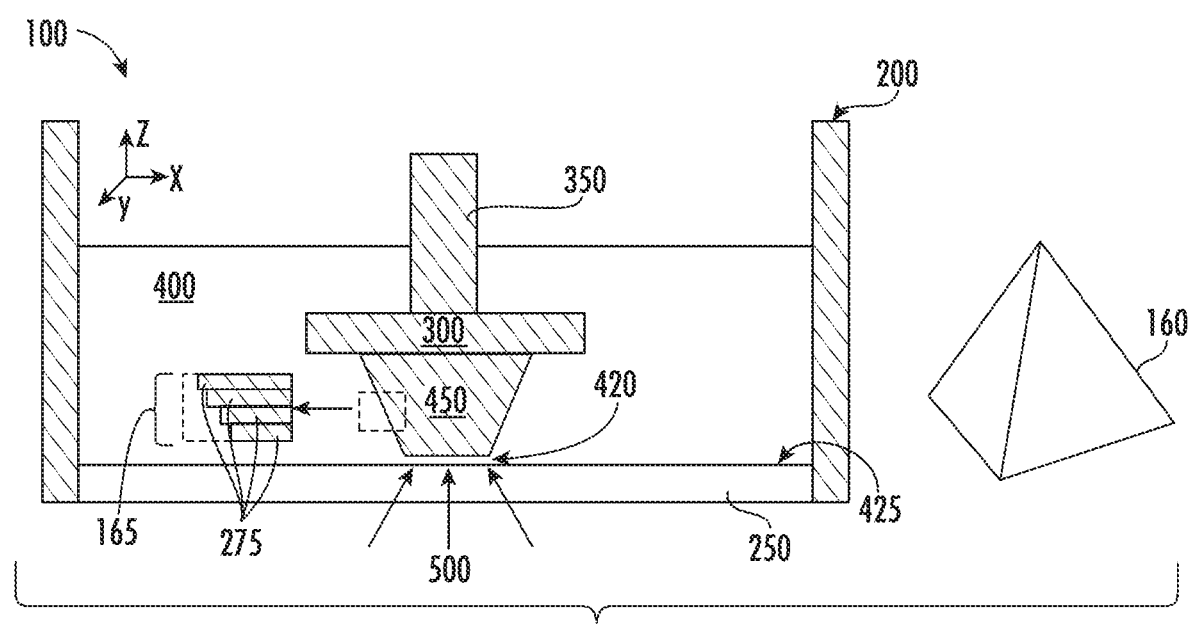
FIG. 2 illustrates a conventional microstereolithography method.

Stereolithography and microstereolithography (μSL) is one type of additive manufacturing. Exemplary devices are shown in FIGS. 1 and 2. Microstereolithography is generally used to refer to the fabrication of objects on a micrometer scale. However, the method and its basic principles may be scalable to a macro scale (that is, stereolithography). Thus, stereolithography and microstereolithography may be used interchangeably throughout the present disclosure.

Microstereolithography allows for the fabrication of 3D objects by sequentially depositing materials, e.g., through radical chain polymerization, to a solid polymer until the object reaches its final geometrical form. Each subsequent addition of material may occur along the height of the object (e.g., along the z-axis). Traditionally, the process may allow for "layer-by-layer" growth, where each layer has a finite thickness.

Provided herein are improved devices and methods for additive manufacturing. Prior methods using resin based additive manufacturing resulted in undesirable adhesion of the printed object to the solid boundary, known as stiction. The present devices and methods may mitigate or reduce stiction and may be used for microfabrication as well as macro-scale manufacturing to enable large scale industrial manufacturing. The present device and methods may have many applications in the additive manufacturing field.

Figure 3:
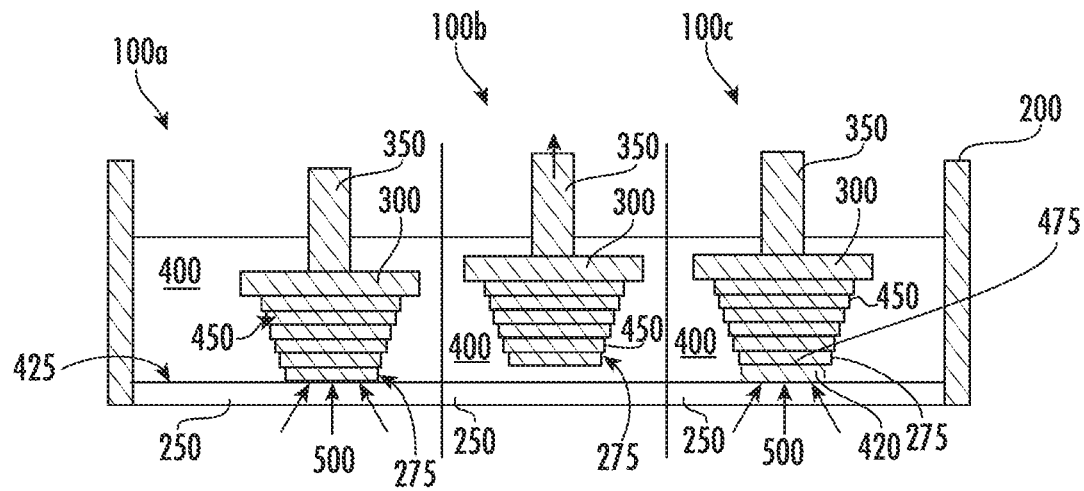
FIG. 3 illustrates a conventional microstereolithography method.

In a typical stereolithography process, the polymerization of liquid monomer into solid polymer may occur at a solid boundary, such as shown, for example, in FIG. 3. The polymerization may occur at the solid-liquid interface, resulting in a solid-solid interface after polymerization. Due to stiction forces, caused by chemical or physical interactions, at the solid-solid interface between the solid polymer and the solid boundary (e.g., glass), the solid polymer may need to be mechanically peeled (e.g., separated) from the solid boundary. Existing methods utilized for separating the solid polymer from the solid boundary include, but are not limited to, one or more of the following methods: pulling the substrate up along the z-axis, sliding the solid boundary and/or substrate along the x-axis and/or y-axis, and tilting (e.g., rotating) the solid boundary and/or the substrate.

Due to the very high stiction forces at the interface between the solid polymer and solid boundary, limitations may be imposed on the process which restrict the geometry of the formed polymer. For instance, existing methods may limit the aspect ratio of the polymerized features. For example, a pillar with a height of about 1000 µm and about 100 µm cross section has an aspect ratio of 10:1. Such a high aspect ratio may be difficult to fabricate with existing methods due to high stiction forces, which may cause the pillar to break during separation. Existing methods of additive manufacturing may also require support structures for overhanging features. Overhanging features are polymer areas which extend beyond the underlying material. Due to the stiction forces, these overhanging features may be difficult to fabricate. Thus, a supporting polymer, which helps maintain the structural integrity, may be needed.

To reduce the stiction forces, no solid boundary may be used at all (e.g., polymerization occurs at a gas-liquid interface (e.g., air or nitrogen-monomer interface)). However, conducting polymerization at an air interface may be challenging because air contains oxygen, which is a known inhibitor of polymerization. In addition, polymerization at a gas-liquid interface may be need to be performed in a top-down orientation, which may limit the maximum height of the formed object to the height of the device used to build the 3D object.

Further, stiction forces may be proportional to surface area. Thus, peeling an area of solid polymer from a solid boundary may become more difficult as the surface area increases, further restricting the geometry of the formed object.

FIG. 1 shows a device 100 for polymerization of a liquid monomer according to a conventional method. The device 100 shown in FIG. 1 includes a containment vessel (e.g., liquid holding tank or monomer bath) 200 accommodating a liquid monomer 400, and a substrate (or build plate) 300, wherein the containment vessel 200 includes a solid boundary 250. When the liquid monomer 400 is exposed to polymerization light 500 through the solid boundary 250, the liquid monomer 400 corresponding to the polymerization light 500 may be polymerized into a solid polymer 450 on the substrate 300. However, stiction occurs at an interface 425 between the solid polymer 450 and the solid boundary 250. The solid polymer 450 may be separated from the solid boundary 250 by applying mechanical force. For example, a substrate holder 350, which is connected to the substrate 300 and moves vertically, may pull the substrate 300 upwards, thereby separating the solid polymer 450 from the solid boundary 250. However, repeated separation by mechanical force makes the solid polymer 450 grow in discrete layers of solid polymer 275, thereby making a layer-by-layer structure having a discrete layered solid polymer surface 165 that is not smooth and continuous. The application of mechanical force may also damage the solid polymer 275 at the interface 425.

FIG. 2 illustrates a conventional microstereolithography device 100 for forming a 3D object. The device 100 illustrated in FIG. 2 includes a containment vessel 200, a substrate 300, a substrate holder 350, and solid boundary 425. The containment vessel 200 holds liquid monomer 400. The solid boundary 425 is transparent to expose the liquid monomer 400 to the polymerization light 500. In the embodiment illustrated in FIG. 2, the polymerization light 500 is patterned and directed to a portion of liquid monomer 420 to be exposed to the polymerization light 500 to form the desired topography on the solid polymer 450. As the portion of liquid monomer 420 is directly adjacent the solid boundary 250 at interface 425, stiction occurs between the resulting solid polymer 450 and solid boundary 250 resulting in the formation of discrete layers of solid polymer 275 forming a discrete layered solid polymer surface 165 and possibly damaging the solid polymer 250. The resulting 3D object 160 is also illustrated in FIG. 2.

FIG. 3 illustrates a conventional microstereolithography method. The device 100 (100a, 100b, 100c) illustrated in FIG. 3 includes a containment vessel 200, a substrate 300, a substrate holder 350, and solid boundary 425, which is glass in this device. The containment vessel 200 holds liquid monomer 400. The solid boundary 425 is transparent to expose the liquid monomer 400 to the polymerization light 500. An interface 425 is between the solid polymer 450 and the solid boundary 250. In FIG. 3, the solid polymer 450 forms as the liquid monomer 400 is exposed to UV light in device 100a. The substrate holder 350 is then pulled up along the z-axis to separate the solid polymer 450 from the solid boundary 250 resulting in a discrete layer of solid polymer 275. Liquid polymer 400 then fills the gap formed by moving the substrate holder 350 to form a portion of liquid monomer 420 to be exposed to polymerization light 500. The portion of liquid monomer 420 is then exposed to light to form a new layer of solid polymer (not illustrated) along the growth surface 475.

Figure 4:
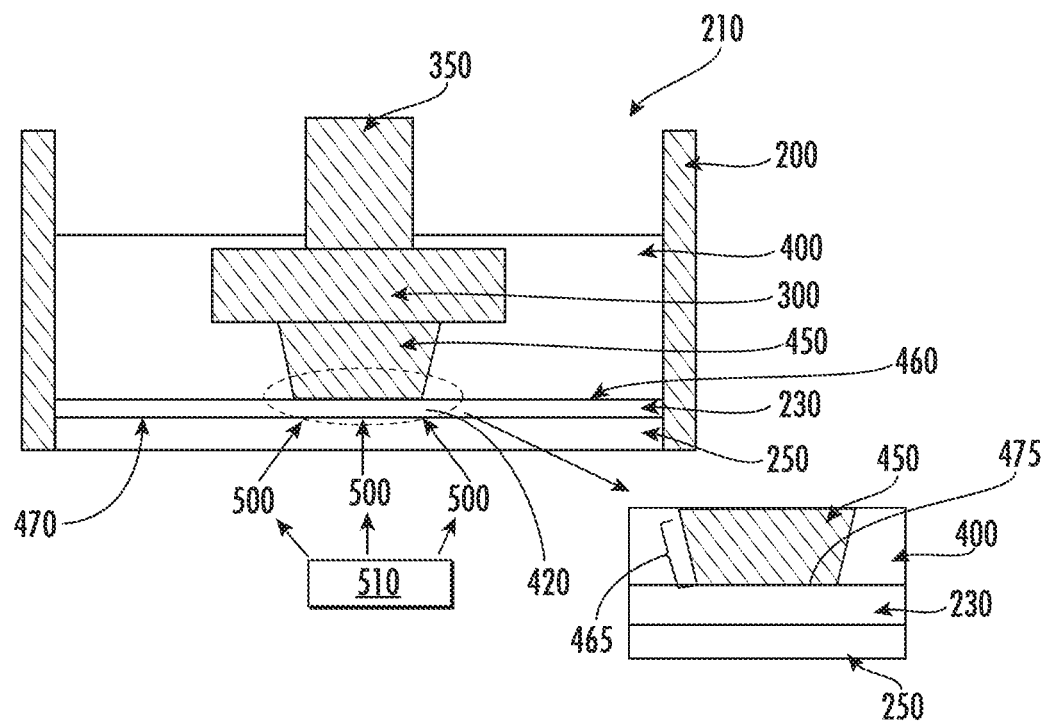
FIG. 4 illustrates a device and method for polymerization in accordance with some embodiments discussed herein.

The present devices and methods may reduce stiction forces, thereby reducing damage to the solid polymer 450, allowing for more flexibility in the geometry of the solid polymer 450, and allowing for the formation of a continuous solid polymer 450 if desired. FIG. 4 illustrates a device and method for polymerization in accordance with some embodiments discussed herein. Referring to FIG. 4, the device 210 includes an inert immiscible liquid 230 between the solid boundary 250 and the substrate 300. In some embodiments disclosed herein, the present devices and methods overcome stiction issues between the solid polymer 450 and the solid boundary 250 with the incorporation of an inert immiscible liquid 230. In the embodiment illustrated in FIG. 4, the inert immiscible liquid 230 has a higher density than the density of the liquid monomer 400, thus allowing the inert immiscible liquid 230 to settle between the liquid monomer 400 and the solid boundary 250. The inert immiscible liquid 230 forms a liquid monomer-inert immiscible liquid interface 460 and a solid boundary-inert immiscible liquid interface 470. In addition, both the solid boundary 250 and the inert immiscible liquid 230 are transparent. When exposed to polymerization light 500 emitted from light source 510, the inert immiscible liquid 230 does not undergo polymerization. Thus, the inert immiscible liquid 230 remains in a liquid state when exposed to polymerization light 500. The liquid monomer 400 polymerizes into a solid polymer 450 at the liquid monomer-inert immiscible liquid interface 460 between the liquid monomer 400 and the inert immiscible liquid 230. In some embodiments, there are no attractive forces or minimal attractive forces causing stiction between the solid polymer 450 formed from the liquid monomer 400 and the inert immiscible liquid 230. In some embodiments, depending on the type of polymerization reaction that occurs, there may be a finite thickness or gradient where no solid polymer 450 is formed at the liquid monomer-inert immiscible liquid interface 460. In such case, the solid polymer 450 may be pulled up without a need for mechanical force as discussed herein.

In embodiments of the present disclosure, the solid boundary 250 can be a solid boundary that is transparent such that a light passes through the solid boundary 250. In some embodiments, the solid boundary 250 may include a patterned photomask. In some embodiments, the solid boundary 250 may be a combination thereof. In some embodiments, different types of materials for the solid boundary 250 may be used (e.g., silicone (e.g., PDMS) instead of glass), and in some embodiments, anti-stiction coatings may be used on top of the solid boundary 250 (e.g., TEFLON™). Further, in some embodiments, thin solid boundaries 250 that are flexible and may act like a diaphragm or membrane may be used.

In some embodiments, the inert immiscible liquid 230 may be encapsulated in an inset/lip in the containment vessel 200.

In embodiments of the present disclosure, a method for polymerization may include preparing the containment vessel 200 including the solid boundary 250, providing the inert immiscible liquid 230 into the containment vessel 200, and providing the liquid monomer 400 into the containment vessel 200. Here, it is possible that the liquid monomer 400 is provided into the containment vessel 200 before the inert immiscible liquid 230 because the density of the inert immiscible liquid 230 may be higher than the density of the liquid monomer 400.

The liquid monomer 400 may then be polymerized into the solid polymer 450 by exposure to polymerization light 500. In some embodiments, polymerization may be performed by heat, magnetic field, electric field, light, or combinations thereof. The substrate holder 350 may vertically pull the substrate 300 attached to the solid polymer 450 to continue the formation of the desired 3D object.

Deposition of liquid monomer 400 to the solid polymer 450 may occur through photopolymerization. Photopolymerization is a free radical chain polymerization reaction which converts liquid monomer 400 (e.g., resin) into a solid polymer 450 through exposure of polymerization light 500, e.g., ultraviolet (UV) light. During photopolymerization, a single monomer may react with other monomers and polymers to form a longer polymer chain, also known as cross linking chain growth reaction, which results in the final product becoming a solid polymer 450. Photopolymerization may be spatially controlled in the x-axis and y-axis through patterning of UV light (e.g., along the z-axis).

To initiate polymerization, the liquid monomer 400 may be exposed to polymerization light 500 by any suitable light source 510. Polymerization light 500 may be of any wavelength that is compatible with photopolymerization of liquid monomer 400. For example, ultraviolet (UV) light can be used for polymerization. In some embodiment, the UV light may be a non-patterned collimated light projected from a mercury arc lamp or an array of LED. In some embodiments, the UV light may be a patterned light projected from a projection system, such as a Digital Light Process (DLP®) projector. In some embodiments, a laser may be used as a light source 510 providing polymerization light 500. Optics can be provided for collimating optics for the non-patterned light, for semi-collimating optics for the patterned light, and for magnifying or de-magnifying. The optics can include mirrors, prisms, and beam splitters. Various methods for patterning UV light for photopolymerization (e.g., laser, photomasks, and projection) may be used. Independent of which light exposure method is chosen, polymerization (e.g., solidification of liquid) may occur in the portion of liquid monomer 420 exposed to polymerization light 500. The polymerization is spatially controlled such that only the desired portion of liquid monomer 420 is polymerized.

Figure 5:
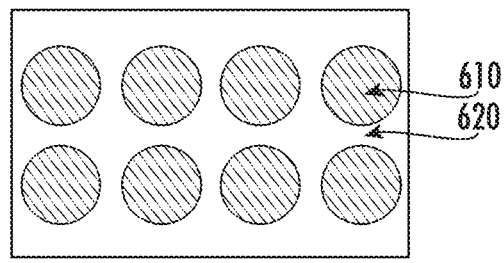
FIG. 5 illustrates the projection of patterned UV light for selective polymerization in accordance with some embodiments discussed herein.

FIG. 5 illustrates the projection of patterned UV light for selective polymerization in accordance with embodiments disclosed herein. In particular, FIG. 5 illustrates the unexposed region 610 and exposed region 620 of liquid monomer 400, where exposure is in reference to exposure to polymerization-inducing polymerization light 500. Unexposed region 610 of liquid monomer 400 may not polymerize while exposed region 620 of liquid monomer 400 may polymerize. With such patterning, solid polymer 450 may be formed in desired patterns resulting in the desired 3D object with the desired form.

In some embodiments, any area that is exposed to polymerization light 500 may be polymerized. For example, when using a DLP® projection method, projected patterned polymerization light 500 may selectively polymerize over the projected area, as shown for example in FIG. 5. The following are exemplary methods for polymerizing liquid monomer 400 that may be used alone or in combination: two-photon method; scanning with a laser (e.g., 0-dimension); patterned photomask with collimated UV light source (e.g., 2-dimension); LCD or LED (e.g., 2-dimension) with a UV light sources; and DLP® projection (e.g., 2-dimension). When using a laser, a UV laser beam may be reflected off galvo scanning mirrors (e.g., along the x-axis and y-axis). The laser beam may be scanned over areas where polymerization may be desired. When using a patterned photomask, a photomask, similar to a stencil, may be used to control where polymerization occurs. This method is similar to that used in photolithography and semiconductor processing. In some embodiments, the solid boundary may be an LED or LCD to generate the patterned polymerization light 500. Examples of the DLP® projection method may include using a DLP® projector with a UV light source. This method is similar to a computer screen projector used in an office. FIG. 5 illustrates the projection of patterned UV light for selective polymerization.

Figure 6:
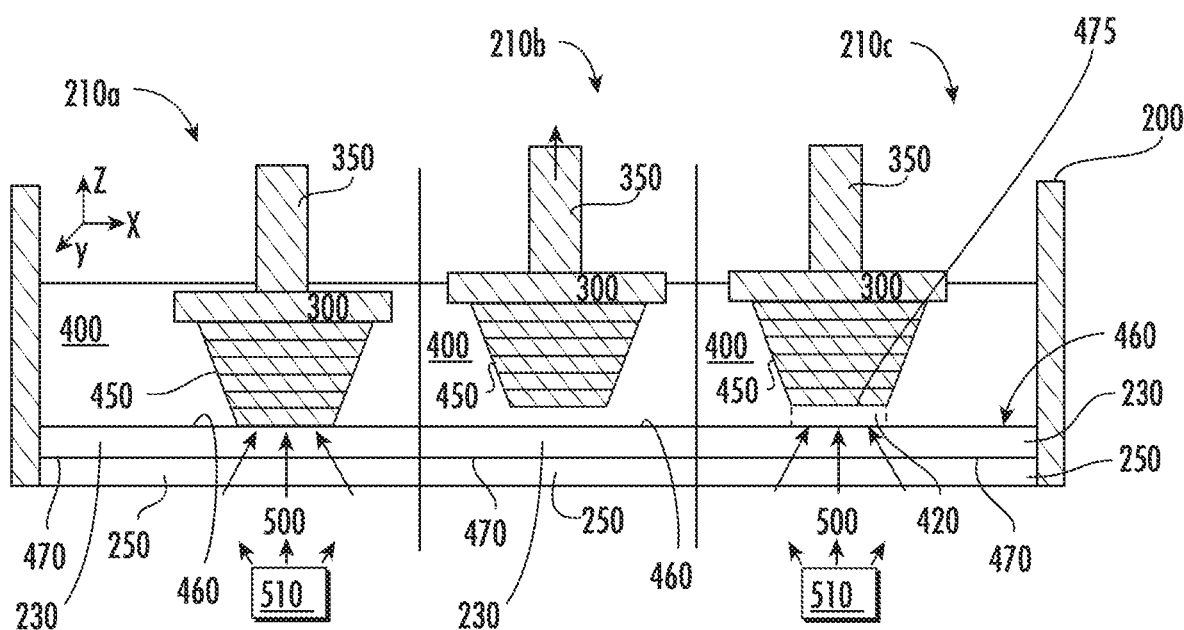
FIG. 6 illustrates a device and method for polymerization in accordance with some embodiments discussed herein.

FIG. 6 illustrates a device and method for polymerization in accordance with some embodiments discussed herein. In particular, FIG. 6 illustrates device 210 (including device 210a, 210b, and 210c) at different points in the disclosed method. In some embodiments of the present device and method, polymerization may occur at a liquid-liquid interface (as shown, for example, at liquid monomer-inert immiscible liquid interface 460 in FIG. 6) instead of a solid-liquid interface (as shown, for example, at interface 425 in FIG. 3).

As shown in the embodiment illustrated in FIG. 6, polymerization occurs at the interface of an immiscible fluid (liquid monomer-inert immiscible liquid interface 460) instead of a solid. The present device and method thereby reduces the stiction force (and in some embodiments, reduces the stiction force to essentially no stiction force) compared to the stiction force present when polymerization occurs at the solid boundary 250.

In the embodiment illustrated in FIG. 6, liquid monomer 400 is immiscible with inert immiscible liquid 230, thus causing separation of the two liquids. When the liquid monomer 400 is exposed to polymerization light 500, photopolymerization occurs at the liquid monomer-inert immiscible liquid interface 460 of the two liquids. Because the inert immiscible liquid 230 is inert to photopolymerization, only the liquid monomer 400 may be cured (e.g., solidified)

and become solid polymer 450. The liquid monomer-inert immiscible liquid interface 460 becomes a liquid-solid interface.

The liquid monomer 400 may be any suitable monomer or resin. For example, the liquid monomer 400 may be 1,6-hexanediol (HDDA), poly(ethylene glycol) diacrylate (PEGDA), any combination thereof, or any other suitable resin or monomer with any suitable additives such as photoinitiators, dyes, absorbers, etc. For instance, the liquid monomer 400 may include 4,4'-bis(dimethylamino)benzophenone as a photoinitiator. The liquid monomer 400 may include 2-hydroxy-4-(octyloxy)benzophenone as a absorber or dye. The inert immiscible liquid 230 may be any suitable inert immiscible liquid, such as a fluorinated solvent such as perfluorocarbon liquid (e.g., FLUORINERT™ or NOVEC™ from 3M™), perfluoropolyether (PFPE) liquid (e.g., FOMBLIN® or KRYTOX™), or combinations thereof. For example, in the embodiment illustrated in FIG. 6, the liquid monomer 400 may be 1,6-Hexanediol diacrylate and the inert immiscible liquid 230 may be a fluorinated solvent such as perfluorocarbon liquid (e.g., FLUORINERT™ or NOVEC™ from 3M™), PFPE liquid (e.g., FOMBLIN® or KRYTOX™), or combinations thereof.

As used herein, reference to an "inert immiscible liquid" may be used. Whether the fluid is inert and/or is immiscible may be a time varying characteristic and may not be static in the present device and method (see e.g., FIG. 19). The inert immiscible liquid 230 may be considered "inert" because the fluid does not take part in the photopolymerization reaction. That is, the inert immiscible liquid 230 may not react with polymerization light 500 (e.g., UV light), such that polymerization light 500 does not affect or cause a chemical reaction to occur in the inert immiscible liquid 230, for example, when compared to the chemical reaction caused in the liquid monomer 400. The degree of "inertness" can be time varying. As long as the inert immiscible liquid 230 does not react or polymerize at the same time as the liquid monomer 400 (e.g., on the same time scale as the liquid monomer 400), the inert immiscible liquid 230 may be considered inert for the present device and method. That is, so long as the polymerization of the liquid monomer 400 occurs at a liquid-liquid interface, the inert immiscible liquid 230 may be considered inert for the present device and method.

Further, the inertness of the inert immiscible liquid 230 may also be a result of intended or unintended components (e.g., solid, liquid, or gas components) present in the inert immiscible liquid 230 that stabilize or inhibit photopolymerization. The inhibition or retardation of photopolymerization may be to the inert immiscible liquid 230 such that the inert immiscible liquid 230 remains inert. The inert immiscible liquid 230 will generally be a different liquid than the liquid monomer 400, such that the two liquids do not mix, but may be made inert to polymerization by the polymerization light 500 with the incorporation of additives. In some embodiments, the inhibition or retardation of photopolymerization may be to the liquid monomer 400 at the liquid monomer-inert immiscible liquid interface 460 resulting in a finite gradient of the degree of inertness of the liquid monomer 400.

Figure 9:
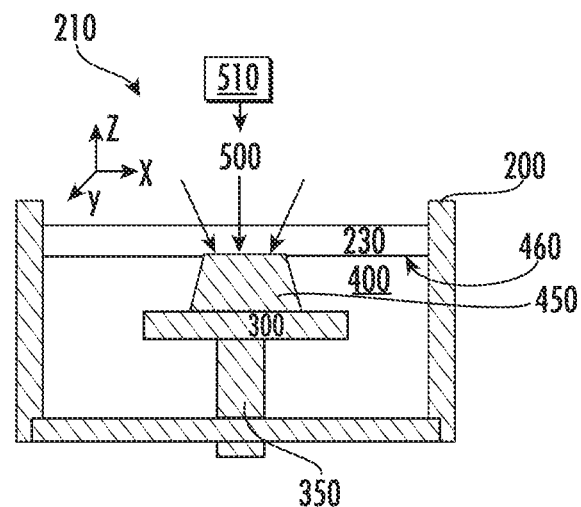
FIG. 9 illustrates a device and method for polymerization in accordance with some embodiments discussed herein.

A difference in density of the inert immiscible liquid 230 and the liquid monomer 400 may enhance the separation of the two fluids. For example, in the embodiment illustrated in FIG. 6, the inert immiscible liquid 230 has a higher density than the density of the liquid monomer 400 (for example, the liquid monomer 400 may be 1,6-hexanediol diacrylate with a density of about 1.1 g/cm$^3$ and the inert immiscible liquid 230 may be a fluorinated solvent with a density of about 1.9 g/cm$^3$). Thus, polymerization is conducted in a bottom-up method. In the embodiment illustrated in FIG. 9, the density of the inert immiscible liquid 230 is lower than the density of the liquid monomer 400. Thus, polymerization is conducted in a top-down method. In the embodiment illustrated in FIG. 9, a solid boundary 250 is not needed to contain the fluids. FIG. 9 illustrates a top down stereolithography process where polymerization occurs at the liquid monomer-inert immiscible liquid interface 460, where the density of the inert immiscible liquid 230 is lower than the liquid monomer 400.

Figure 10:
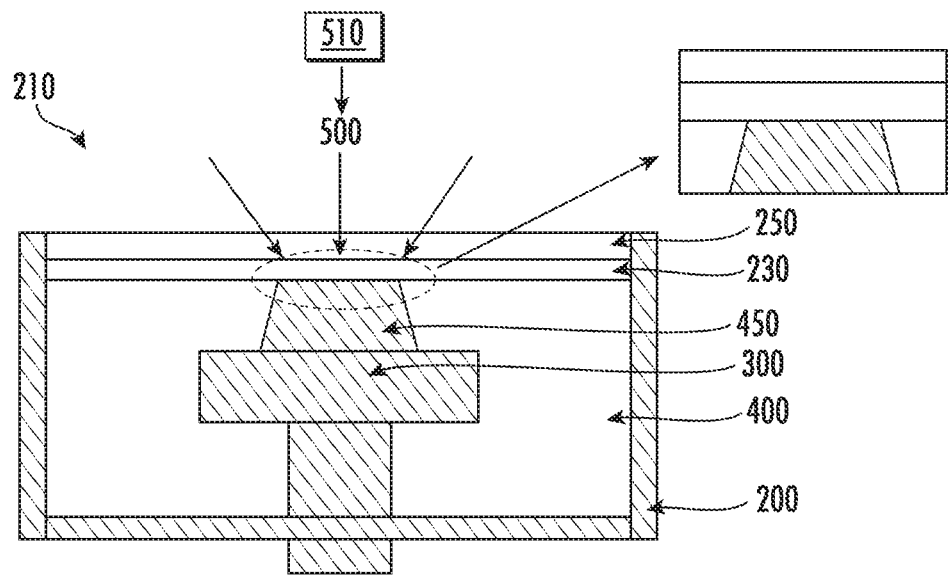
FIG. 10 illustrates a device and method for polymerization in accordance with some embodiments discussed herein.

FIG. 10 also illustrates a top-down polymerization. In particular, FIG. 10 illustrates a device and method for polymerization in accordance with some embodiments discussed herein. Referring to FIG. 10, the liquid monomer 400 is exposed to polymerization light 500 from the top of the containment vessel 200. The polymerization light 500 is above the containment vessel 200, the solid boundary 250, inert immiscible liquid 230, the solid polymer 450, and the liquid monomer 400 that are serially stacked in a vertical direction. The density of the inert immiscible liquid 230 may be lower than that of the liquid monomer 400.

The spatial orientation for the device and method can be in any direction: top-down, bottom-up, left-right, right-left. In some embodiments, the device and method takes advantage of differences in density and may have a top-down or bottom-up orientation.

In some embodiments, the inert immiscible liquid 230 can be fully immiscible with the liquid monomer 400. For example, the two components cannot mix together and therefore, separate out (e.g., oil and water).

In some embodiments, the inert immiscible liquid 230 may be technically miscible with the liquid monomer 400 but inert. Due to differences in density of the inert immiscible liquid 230 and the liquid monomer 400 or after reaching a solubility limit, the separation of the two liquids can occur. That is, the inert immiscible liquid 230 is considered an "inert immiscible liquid" in that it separates from the liquid monomer 400 forming a liquid monomer-inert immiscible liquid interface 460. A gradient of partially miscible liquids at the liquid monomer-inert immiscible liquid interface 460 may form. The gradient of miscibility may be leveraged to control the process.

Figure 7:
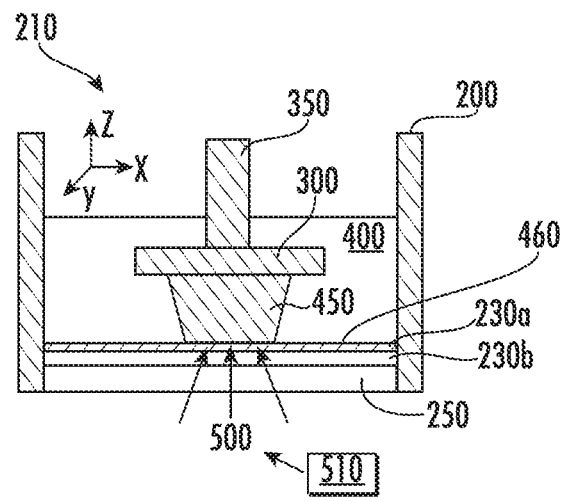
FIG. 7 illustrates a device and method for polymerization in accordance with some embodiments discussed herein.

In some embodiments, the inert immiscible liquid 230 may be partially miscible with the liquid monomer 400. In some embodiments, the inert immiscible liquid 230 may be fully immiscible with the liquid monomer 400 or partially miscible. If partially miscible, a gradient of miscibility may form at the liquid monomer-inert immiscible liquid interface 460. An example of the gradient can be manifested as an emulsification. In some embodiments, the gradient of miscibility may be leveraged to control polymerization. For example, as shown in FIG. 7, the reaction may occur at the emulsified gradient such that the solidified 3D object includes trapped contents of the inert immiscible liquid 230. FIG. 7 illustrates polymerization at the interface of a partially miscible inert immiscible liquid 230 and liquid monomer 400 (the liquid monomer-inert immiscible liquid interface 460). The inert immiscible liquid 230 includes a gradient or emulsified region of inert immiscible liquid 230$a$ and a non-emulsified region of inert immiscible liquid 230$b$. Polymerization may result in the inert immiscible liquid 230 trapped inside a matrix of solid polymer 450. The resulting 3D object may become a composite which may include the inert immiscible liquid 230 and the solid polymer 450. The present device and method allow for the creation of structured 3D objects with complex geometries.

In some embodiments, the inert immiscible liquid 230 may be reactive but is immiscible such that polymerization occurs at the liquid monomer-inert immiscible liquid interface 460. For instance, in some embodiments, it may be desired to intentionally react the inert immiscible liquid 230 with the liquid monomer 400. The inert immiscible liquid 230 may react at the liquid monomer-inert immiscible liquid interface 460, but the inert immiscible liquid 230 is still considered inert in that it does not form a polymer outside of the liquid monomer-inert immiscible liquid interface 460. That is, the inert immiscible liquid 230 may be a reactant in the polymerization reaction of the liquid monomer 400 to form the solid polymer 450. In some embodiments, it may be desired to form a 3D object which may incorporate the inert immiscible liquid 230. The present device and method may allow for the formation of a 3D object which may contain the inert immiscible liquid 230 (such as in the embodiment illustrated in FIG. 7).

In some embodiments, the degree of miscibility may be time varying and may be leveraged during polymerization. For example, if two immiscible liquids are put into a vial following by shaking, agitation, sonication, etc., the two liquids may mix and over time (e.g., after 5 minutes, 15 minutes, 1 hour, 2 hours, etc.), the two liquids may separate out and become immiscible again.

Figure 8:
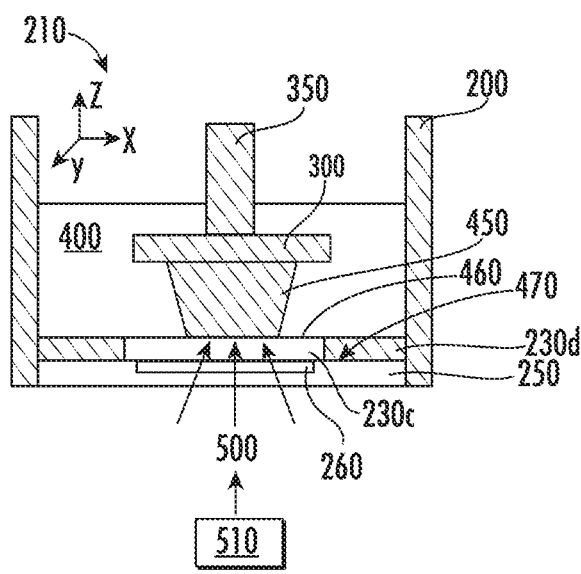
FIG. 8 illustrates a device and method for polymerization in accordance with some embodiments discussed herein.

In some embodiments, the degree of miscibility, surface tension, interface properties, phase of material, or other properties may be temperature varying. The temperature of each liquid may be controlled to increase or decrease any of these properties. For example, the temperature may be changed locally or over the whole device 210. In the embodiment illustrated in FIG. 8, a micro heater 260 was used to locally increase the temperature resulting in a liquid phase of the inert immiscible liquid 230c from a solid phase of the inert immiscible liquid 230d. In some embodiments, a thermoelectric cooler attached near the solid boundary 250 may be used to locally heat or cool the inert immiscible liquid 230 over a portion of the solid boundary-inert immiscible liquid interface 470 or may be used to heat or cool the whole solid boundary-inert immiscible liquid interface 470.

In some embodiments, the inert immiscible liquid 230 is a liquid. That is, the inert immiscible liquid 230 is a substance that continually deforms (e.g., flows) under an applied shear stress. The inert immiscible liquid 230 may become a liquid during the process by selectively or locally changing temperature or pressure. For example, in the embodiment illustrated in FIG. 8, the inert immiscible liquid 230 is originally present as a solid phase of the inert immiscible liquid 230d, but is selectively or locally melted and turned into a liquid using micro heater 260 embedded or printed on the solid boundary 250 forming a liquid phase of the inert immiscible liquid 230d.

The inert immiscible liquid 230 may change depending on the desired 3D object. For instance, in some embodiments, the miscibility of the inert immiscible liquid 230 may be increased or decreased depending on the desired 3D object. In some embodiments, the surface tension and meniscus between the liquid monomer-inert immiscible liquid interface 460 may be controlled to obtain the desired 3D object.

In some embodiments, the thickness of the inert immiscible liquid 230 may be any suitable thickness to provide the appropriate liquid monomer-inert immiscible liquid interface 460. For example, the thickness of the inert immiscible liquid 230 may be about 1 µm, 10 µm, about 100 µm, about 1 mm, about 10 mm, about 25 mm, about 50 mm, etc., such as from about 1 µm to about 10 mm thick, about 10 µm to about 1 mm, about 10 µm to about 100 µm, or about 10 µm to about 50 µm.

In some embodiments, the inert immiscible liquid 230 may be transparent. The inert immiscible liquid 230 may be transparent or semi-transparent to polymerization light 500 at the wavelength of light that initiates polymerization of the liquid monomer 400. In some embodiments, transparency may be defined as such that enough light photons can reach the liquid monomer 400 without significant absorption by the inert immiscible liquid 230 so that reaction in the liquid monomer 400 may occur. As noted above, the wavelength of polymerization light 500 for polymerization may be any wavelength and is not limited to the UV spectrum.

In some embodiments, the inert immiscible liquid 230 may be homogenous or heterogeneous (e.g., a mixture). The inert immiscible liquid 230 may be a pure liquid or a mixture of multiple types of liquids. For example, the inert immiscible liquid 230 may be 3M™ FLUORINERT™ FC-72 mixed with 3M™ NOVEC™. In some embodiments, the inert immiscible liquid 230 may be a mixture of liquid mixed with multiple solids. For example, the inert immiscible liquid 230 may be 3M™'s FLUORINERT™ mixed with TEFLON™ AF and/or CYTOP®. In some embodiments, the concentration of the solid/liquid mixtures may vary depending on the application. For instance, in some embodiments, high concentrations of solids mixed with low concentrations of liquids to form a "wet sponge" like liquid monomer-inert immiscible liquid interface 460 may be used.

In some embodiments, the degree of miscibility and surface tension may be controlled by the addition of additives. In some embodiments, additives to the inert immiscible liquid 230 may change the surface properties of the inert immiscible liquid 230 at the liquid monomer-inert immiscible liquid interface 460 by operating as a surfactant. For instance, the surface tension at the liquid monomer-inert immiscible liquid interface 460 may be controlled by adding additives to either the liquid monomer 400 and/or the inert immiscible liquid 230. For instance, KRYTOX™ and/or FOMBLIN® may be added to 3M™ FLUORINERT™, which may be the inert immiscible liquid 230. The additives may have a range of solubility in either the inert immiscible liquid 230 or the liquid monomer 400. That is, in some embodiments, the additive may precipitate to the liquid monomer-inert immiscible liquid interface 460 which may also change the surface tension properties.

Figure 12:
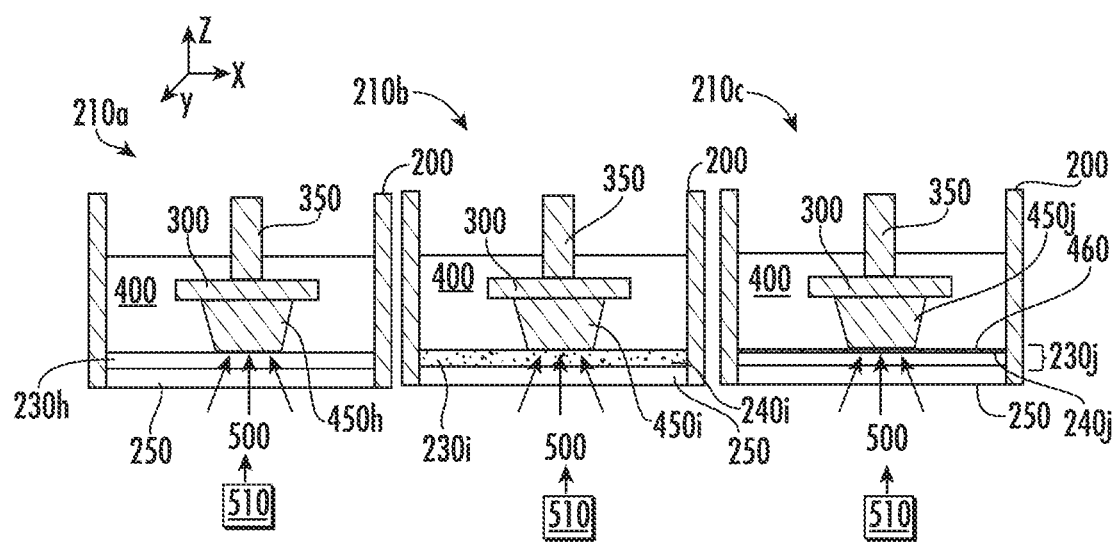
FIG. 12 illustrates a device and method for polymerization in accordance with some embodiments discussed herein.

In the embodiment illustrated in FIG. 12, additives were added to the inert immiscible liquid 230. In particular, FIG. 12 illustrates device 210a, 210b, and 210c, where additives were added to inert immiscible liquid 230i and 230j. Inert immiscible liquid 230h does not contain additives. Additives (e.g., solid, liquid, and/or gas additives) may be intentionally added to the inert immiscible liquid 230. These additives may be soluble or insoluble in the inert immiscible liquid 230. In embodiments where the additives are insoluble or semi-soluble in the inert immiscible liquid 230, the additives may precipitate to the liquid monomer-inert immiscible liquid interface 460. For example, in the embodiment illustrated in FIG. 12, additives 240j precipitated in inert immiscible liquid 230j to the liquid monomer-inert immiscible liquid interface 460. In device 210b, the additives 240i are distributed throughout inert immiscible liquid 230i. In some embodiments, the additives may have a gradient of concentration at the liquid monomer-inert immiscible liquid interface 460. The gradient may be intentionally leveraged for the application.

In some embodiments, additives may be added to the liquid monomer 400. For instance, soluble or insoluble additives may be added to the liquid monomer 400, and if insoluble or semi-soluble, these additives may precipitate to the liquid monomer-inert immiscible liquid interface 460 forming a gradient of concentration at the interface. The additives may interact with the liquid monomer 400 to form a matrix/composite structure of the additives embedded in the solid polymer 450 or may chemically react with the liquid monomer 400 for form part of the polymer chain in the solid polymer 450. The additives can physically interact with the liquid monomer 400 and the polymerization process thus resulting in a matrix/composite structure in the resulting 3D object or the additives can chemically react with the liquid monomer thus modifying or affecting the polymerization process when forming the solid polymer 250.

In some embodiments, the additives (e.g., additives 240*i* or 240*j*) may react with the liquid monomer 400 to become part of the matrix of the 3D object (e.g., part of the solid polymer 450 matrix). The reaction of additives with the liquid monomer 400 may be chemical or physical. The bonding of additives with the solid polymer 450 may be chemical or physical. The inert immiscible liquid 230 may act as a carrier or delivery mechanism of the additives to the liquid monomer 400 to be included in the solid polymer 450 matrix. In some embodiments, this construction may be beneficial when certain additives are desired to be part of the 3D object. The certain additives may be otherwise difficult to dissolve in the liquid monomer 400. For example, ceramic or metal nanoparticles may be suspended in the inert immiscible liquid 230. During UV exposure, the nanoparticles may bond chemically or physically to the polymerized 3D object, thus becoming part of the solid polymer 450. In the embodiment illustrated in FIG. 12, additives 240*i* and 240*j* were distributed throughout solid polymer 450*i* and 450*j*, respectively, after polymerization of the liquid monomer 400.

In the embodiment illustrated in FIG. 12, additives were added in the inert immiscible liquid 230 to control the reaction of the process (e.g., increase or decrease the polymerization rate, initiate polymerization, etc.). The additives may act as catalysts or inhibitors of the reaction process. In the embodiment illustrated in FIG. 12, additives 240*i*, 240*j* were added to the inert immiscible liquid 230*i*, 230*j* to use the inert immiscible liquid 230*i*, 230*j* as a delivery mechanism to the solid polymer 450*i*, 450*j*. In some embodiments, additives may have a gradient of concentration at the liquid monomer-inert immiscible liquid interface 460 where this gradient can be intentionally leveraged for the process. The additives may be added to increase the reaction at the liquid monomer-inert immiscible liquid interface 460, thus increasing the production speed of the 3D object. For example, a photoinitiator that is difficult to dissolve in the liquid monomer 400, but easier to dissolve in the inert immiscible liquid 230 may be added to the inert immiscible liquid 230. By introducing the photoinitiator through the inert immiscible liquid 230, a higher concentration of the photoinitiator may be delivered to the liquid monomer-inert immiscible liquid interface 460 where polymerization takes place. The objective of the photoinitiator may be to initiate and/or speed up polymerization in the liquid monomer.

In some embodiments, the reaction rate may be modified by bubbling nitrogen gas into the inert immiscible liquid 230 before or during the process to decrease the oxygen gas concentration. Oxygen may be an inhibitor or retarder of polymerization, thus by decreasing the oxygen concentration, the reaction rate may be increased.

In some embodiments, additives (e.g., additives 240*i* or 240*j*) may be intentionally or unintentionally added to the inert immiscible liquid 230 in order to reduce or inhibit polymerization at the liquid monomer-inert immiscible liquid interface 460. For example, oxygen may be unintentionally added to the inert immiscible liquid 230 due to high oxygen solubility. Oxygen may act as an inhibitor or retarder of polymerization at the liquid monomer-inert immiscible liquid interface 460. Air or oxygen may be bubbled into the inert immiscible liquid 230 to increase the concentration of oxygen to inhibit or retard polymerization.

In some embodiments, additives may cause a gradient of the polymerization rate which can be leveraged for the process. For example, the equilibrium concentration of oxygen may result in a gradient of the polymerization rate inhibition resulting in no polymerization (that is no solid formation) directly at the liquid monomer-inert immiscible liquid interface 460, which may avoid the need for the dewetting process as discussed herein. Oxygen may be added to the inert immiscible liquid 230 to create this inhibition of polymerization. The inert immiscible liquid 230 is a different liquid than the liquid monomer 400 to allow for separation of the liquids, whether additives are added to the inert immiscible liquid 230 or not.

In the present device and method, polymerization may occur at the liquid monomer-inert immiscible liquid interface 460. If inhibitors are added to the inert immiscible liquid 230, such inhibitors may modify the polymerization reaction. In general, with inhibitors such as oxygen, the concentration of inhibitors may decrease over time or require a significant concentration of inhibitor to maintain the desired change in polymerization. Further, if the inhibitor is sourced through a solid membrane, the permeability of the membrane may dictate whether the needed amount of inhibitor is present. However, since an inert immiscible liquid 230 is used in the present device and method, such decrease in concentration of inhibitor, which may naturally occur over time, or emphasis on the selection of permeable membrane may not be of concern because polymerization occurs at the liquid monomer-inert immiscible liquid interface 460 (a liquid-liquid interface) and not at a solid-solid interface, thus, stiction may be reduced. If the inert immiscible liquid 230 were not present, a decrease in concentration of inhibitor may lead to a solid-solid interface after polymerization, which as discussed previously results in high stiction forces between the two solid components.

Figure 11:
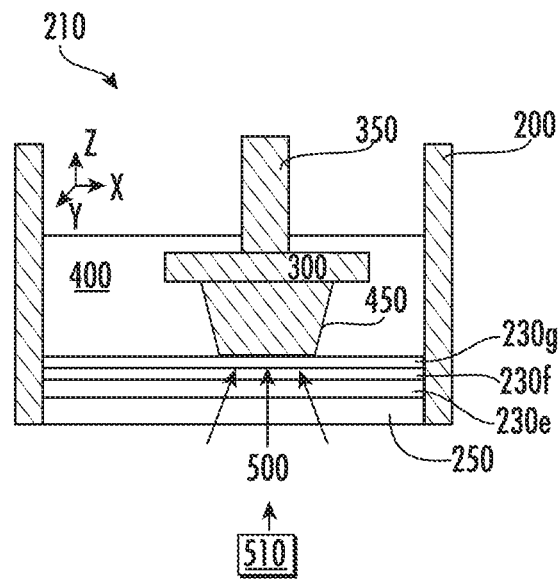
FIG. 11 illustrates a device and method for polymerization in accordance with some embodiments discussed herein.

In some embodiments, the inert immiscible liquid 230 may include a plurality of inert immiscible liquids. For example, in the embodiment illustrated in FIG. 11, the inert immiscible liquid 230 includes a stack of multiple immiscible liquids 230*e*, 230*f*, 230*g*. Each of the inert immiscible liquids 230*e*, 230*f*, 230*g* can have varying degrees of miscibility and solubility to each other, and varying differences in density. The stacking of multiple types of liquids may help control the total inert immiscible liquid 230 thickness. In addition, it may be helpful to control the meniscus caused by the difference in surface energy between the inert immiscible liquid 230 and liquid monomer 400.

In some embodiments, the solid boundary 250 (e.g., glass as shown in FIG. 6) may be coated with other materials to improve the wettability of the solid boundary 250 to the inert immiscible liquid 230. For example, the solid boundary 250 may include glass and may be coated with TEFLON™ AF, CYTOP®, or combinations thereof. In some embodiments, the coating may help control the thickness and spreading of inert immiscible liquid 230 on the solid boundary 250. In some embodiments, the coating may help control the optical path of the polymerization light 500 in the presence of inert immiscible liquids 230. In some embodiments, the coating may keep the solid boundary 250 surface clean and free from contamination from the liquid monomer 400 that may adsorb to the solid boundary 250 and affect its optical characteristic.

Figure 13:
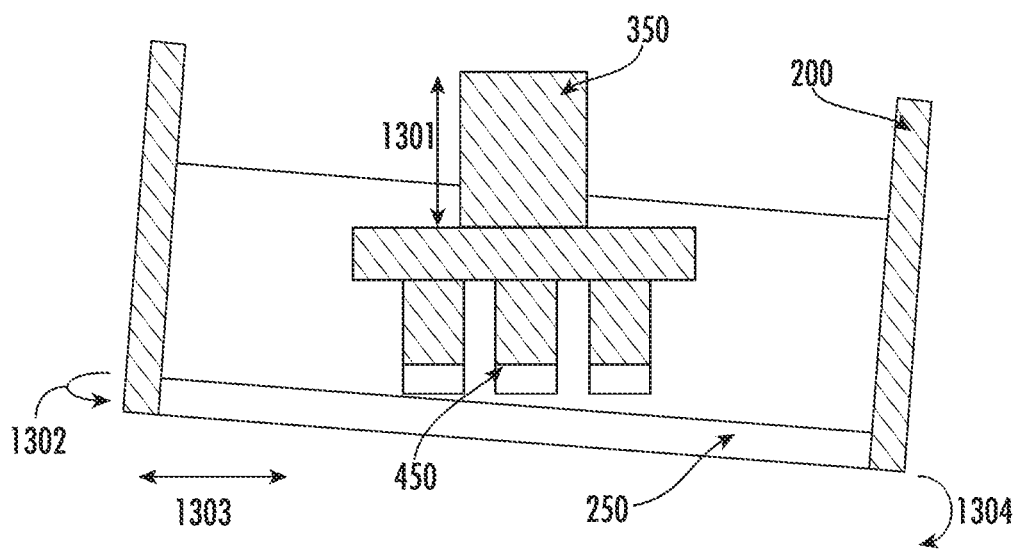
FIG. 13 illustrates a method of removing a solid polymer from a solid boundary.

The present device and method allow for continuous fabrication of the solid polymer 450 without the formation of discrete layers (e.g., discrete layer of solid polymer 275 shown in FIG. 3) by reducing the stiction issues found in traditional methods of additive manufacturing and removing the need to separate the solid polymer 450 from the solid boundary 250 after formation of each layer of solid polymer 450. FIG. 13 shows a method of separating a solid polymer 450 from a solid boundary 250 where the solid polymer has been prepared in a convention device and method. Referring to FIG. 13, after polymerization, the solid polymer 450 can be separated from the solid boundary 250 by mechanical sliding 1303, tilting 1304, pulling 1301, or rotating 1302. That is, the containment vessel 200 may slide in a horizontal direction, rotate, or tilt for separation, or the substrate holder 350 may pull the solid polymer 450 in a vertical direction.

As shown in FIG. 3, the separation or peeling process may involve stiction forces at the interface 425. In device 210*b* of FIG. 6, an example separation process of the present device and method is illustrated. The solid polymer 450 may be separated from the inert immiscible liquid 230 by any suitable method. While various separation methods are discussed herein, the separation of the solid polymer 450 from the inert immiscible liquid 230 in the present device and method will involve reduced stiction forces compared to the stiction forces present in solid-solid interface separation. The separation process may be referred to as dewetting and may be needed due to "wetting" of the liquid (e.g., the inert immiscible liquid 230) to the solid polymer 450. However, in some embodiments, dewetting may not be needed depending on how polymerization at the liquid monomer-inert immiscible liquid interface 460 occurs or may be performed only when the 3D object is fully formed. In some embodiments, the solid polymer 450 may be continuously separated from the inert immiscible liquid 230 during exposure and polymerization of the liquid monomer 400. The separation also allows the new gap to be filled with unreacted liquid monomer 400, thus forming more solid polymer 450. The separation process can occur by various methods or the separation process may be entirely avoided.

For instance, in some embodiments, dewetting by pulling, sliding, titling, rotating, vibrating, or combinations thereof may be performed. For instance, the substrate may be pulled, slid, tilted, rotated, vibrated, or combinations thereof, in any direction with respect to the solid boundary 250 or with the respect to the inert immiscible liquid 230. This separation may be used to separate the inert immiscible liquid 230 from the solid polymer 450.

Figure 14:
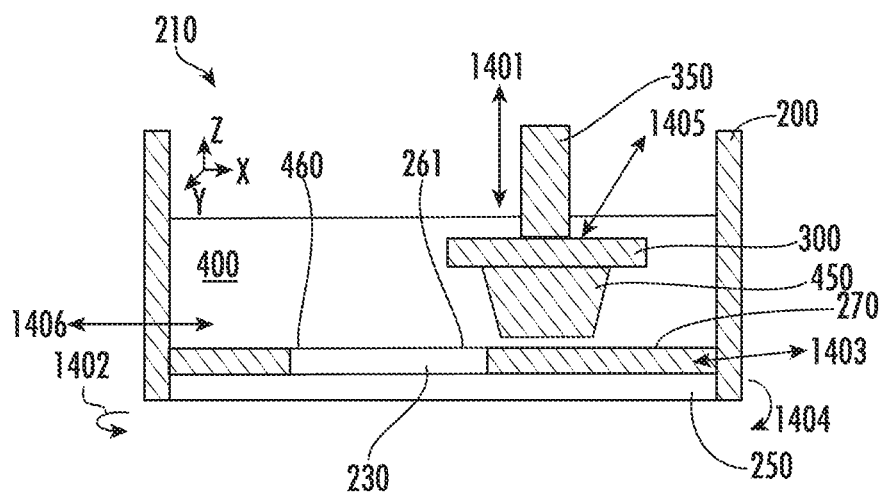
FIG. 14 illustrates a method of removing a solid polymer in accordance with some embodiments discussed herein.

The embodiment illustrated in FIG. 14 provides an example of dewetting. In particular, FIG. 14 illustrates examples of various methods of separating the solid polymer 450 from the inert immiscible liquid 230. In particular, FIG. 14 illustrates vibrating, rotation 1402 of containment vessel 200, pulling 1401 substrate 300, sliding 1405 of substrate 300, sliding 1403 of the containment vessel 200, and tilting 1404 of the containment vessel 200. Any of these methods may be used at any variation of velocity and acceleration. Any combination of these methods may occur at any point in the process, for example, during exposure to polymerization light 500 or during the separation process. For example, vibration 1406 may occur in any direction (e.g., left/right or up/down), at any frequency, and for any displacement. The vibration 1406 may occur due to the attachment of a piezo actuator onto the device 210, using a motor attached to the device 210 or the substrate 300, or combinations thereof.

Also illustrated in FIG. 14, in some embodiments, the inert immiscible liquid 230 may be confined to a groove or portion of the containment vessel 200 such that the inert immiscible liquid 230 does not traverse the full length and/or width of the containment vessel 200. Thus, the liquid monomer-inert immiscible liquid interface 460 spans only a portion of the length and/or width of the containment vessel 200. In the embodiment illustrated in FIG. 14, the inert immiscible liquid 230 is confined to a groove 260 disposed in bottom portion 270 of the containment vessel. Variations on the location and placement of the inert immiscible liquid 230 are available without deviating from the scope of the present disclosure.

Figure 15:
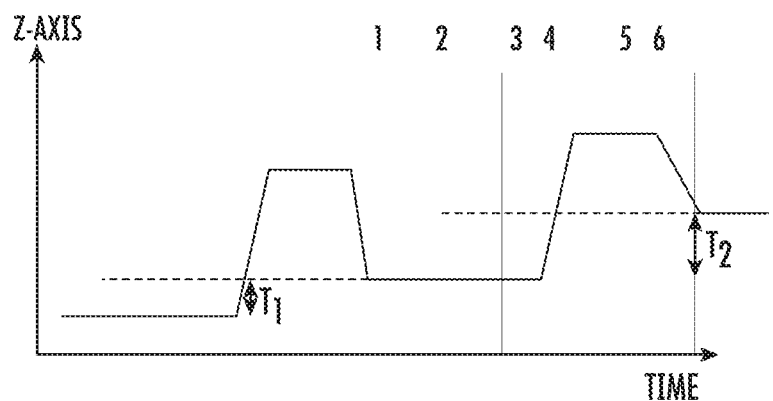
FIG. 15 illustrates a comparison of the substrate position verse time profile in accordance with some embodiments discussed herein.

In some embodiments the substrate 300 may be moved higher than the distance equal to the thickness of the next exposure of liquid monomer 400 and then moved lower to form the desired new exposure of liquid monomer 400. For example, the embodiment illustrated in FIG. 15 illustrates one example of a substrate 300 position profile between each exposure in a separation process. In particular, FIG. 15 illustrates an example of substrate position (z-axis position of the substrate 300) vs. time profile to convey steps between the each exposure steps. Time 1 is before exposure, time 2 is UV exposure, time 3 is after exposure, time 4 is while moving substrate up, time 5 is before going to new exposure position, and time 6 is while moving substrate down. In the embodiment illustrated in FIG. 15, the thickness of exposure 1 (T1) is about 20 µm and the thickness of exposure 2 (T2) is about 40 µm. The thickness of each exposure may be modified per the desired 3D object. Since the present device and method involve the separation of solid polymer 450 from inert immiscible liquid 230 at the liquid monomer-inert immiscible liquid interface 460, the stiction forces will be reduced and, thus, undesired discrete layers through the resulting 3D object may be avoided or intentionally introduced.

Figure 16:
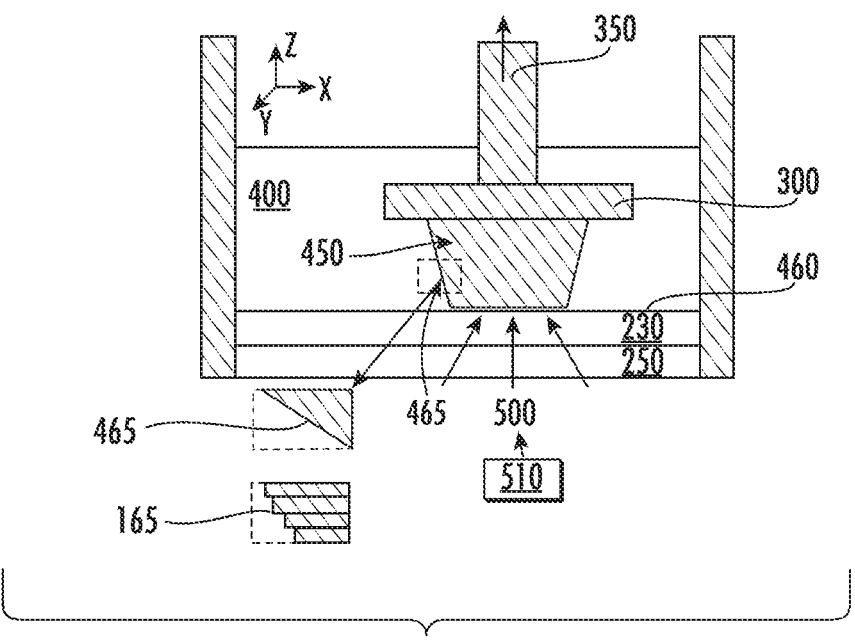
FIG. 16 illustrates a device and method for polymerization in accordance with some embodiments discussed herein.

In some embodiments, the substrate may be moved continuously in any direction (e.g., upwards) during exposure (e.g., exposure 1 of FIG. 15). The embodiment illustrated in FIG. 16 is an example of continuous exposure of polymerization light 500 while continuously moving the substrate 300 upwards. In particular, FIG. 16 illustrates continuous pulling of the substrate 300 to allow for continuous exposure to polymerization light 500 and growth of solid polymer 450. This method results in uninterrupted formation of the 3D object that takes the form of the patterned polymerization light 500. As shown in FIG. 16, the solid polymer 450 prepared according to the present device and method has a smoother solid polymer surface 465 compared to the discrete layered solid polymer surface 165 prepared according to prior processes. Accordingly, continuous non-discrete growth of the solid polymer 450 forming a 3D object may be performed. As shown for instance in FIG. 16, the solid polymer has a smooth surface 465. That is, the solid polymer surface 465 is smooth along the direction of growth (e.g., along the z-axis) and does not include discrete layers. As used herein, discrete layers refers to defined layers formed perpendicular to the direction of growth (e.g., the z-axis). The discrete layers typically extend along the growth surface 475 of the solid polymer where the liquid monomer 400 is exposed to polymerization light 500. In some embodiments, discrete layers may be intentionally formed. However, the present device and method allow for the formation of a continuous solid polymer 450 if desired.

Figures 17A, 17B:
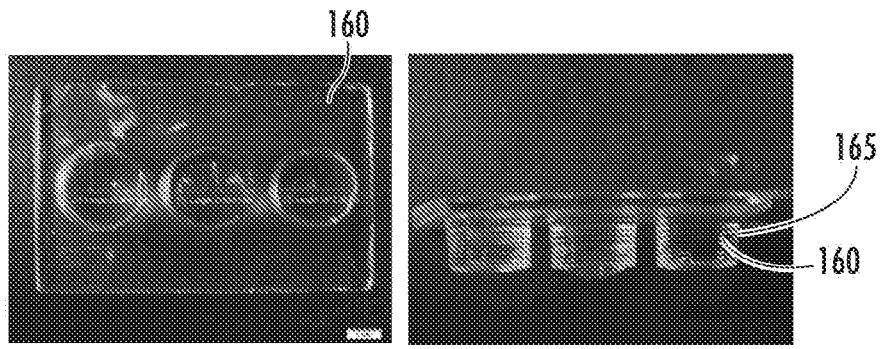
FIG. 17 shows exemplary 3D samples formed in accordance with some embodiments discussed herein.
Figures 17C, 17D:
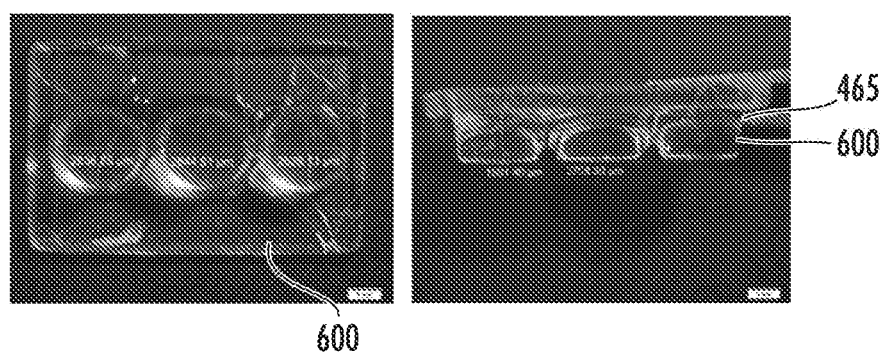

FIGS. 17(*a*)-17(*d*) shows an example of the fabricated sample using this method compared to the discrete separation method. In particular, FIGS. 17(*a*)-17(*d*) show examples of a 3D object 160 manufactured by a conventional method, and a 3D object 600 according to an embodiment of present device and method. In particular, FIG. 17(*a*)-17(*d*) provide microscope pictures of a fabricated 3D object 160 conventionally prepared compared to microscope pictures of a fabricated 3D object 600 prepared according to embodiments of the present device and method. FIGS. 17(*a*) and 17(*b*) show a top view and a side view of the 3D object 160 grown by layer-by-layer growth process of conventional methods, and FIGS. 17(*c*) and 17(*d*) show a top view and a side view of the 3D object 600 grown by continuous growth of the present device and method. As shown in FIGS. 17(*a*)-17(*d*), the 3D object 160 manufactured by the conventional method shows a rough lateral surface indicating discrete layer-by-layer growth, and the 3D object 600 manufactured by the present device and method shows a smooth lateral surface indicating continuous growth.

Figure 18:
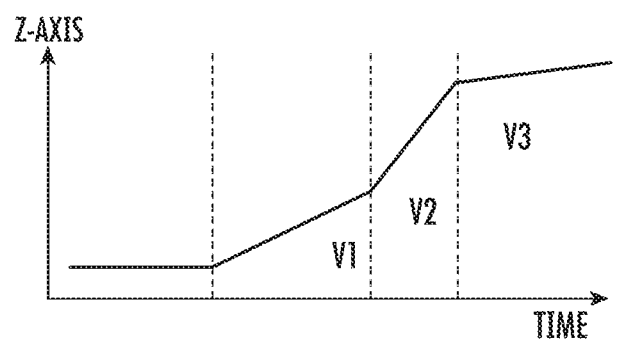
FIG. 18 illustrates the substrate movement position profile verse time in accordance with some embodiments discussed herein.

In some embodiments, the velocity and/or acceleration of the continuously moving substrate 300 may change at various times depending on different polymerization rates required as shown for example in FIG. 18. In particular, FIG. 18 illustrates the substrate 300 movement position profile (z-axis position of substrate) verse time for changing velocities (e.g., V1 (velocity 1), V2 (velocity 2), and V3 (velocity 3)). The patterning of the polymerization light 500 may also change at various times to create a truly 3D object 600 instead of 2D extruded object.

Any combination of the separation processes may be used to help ensure migration of fresh unreacted liquid monomer 400 from the surrounding into the new gap formed with continuous separation.

Figure 19:
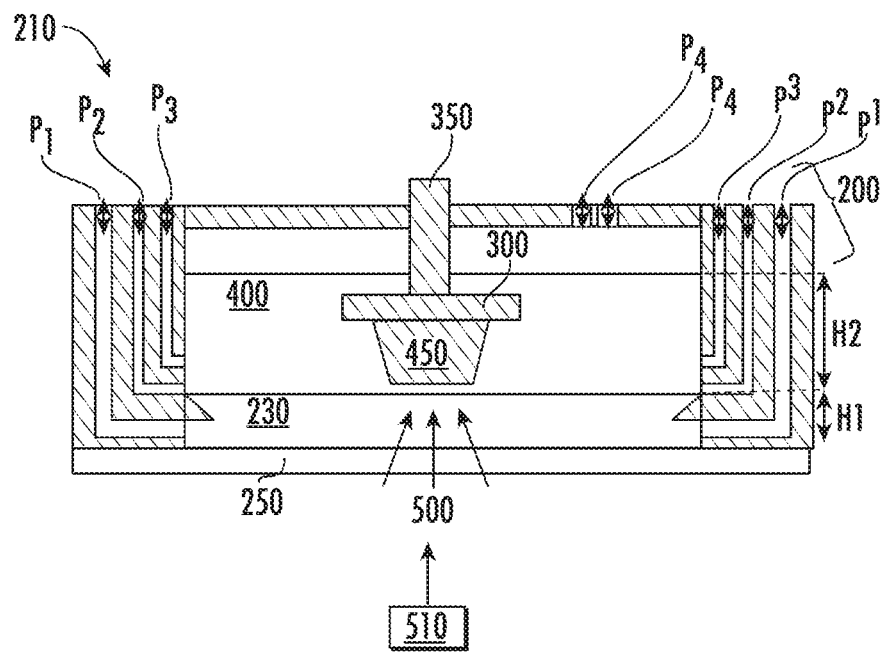
FIG. 19 illustrates a device and method for polymerization in accordance with some embodiments discussed herein.

FIG. 19 shows an example of a device which would allow polymerization at the liquid monomer-inert immiscible liquid interface 460. In particular, FIG. 19 illustrates an exemplary device as disclosed herein. In the embodiment illustrated in FIG. 19, multiple inlet and outlet ports are shown for injecting and withdrawing materials to the containment vessel 200. In particular, in the embodiment illustrated in FIG. 19, the device 210 includes inlet and outlet port for the inert immiscible liquid P1, general purpose inlet and outlet port P2, and inlet and outlet port for the liquid monomer P3. In addition, the embodiment illustrated in FIG. 19 includes a general purpose inlet and outlet port for other components P4 such as vacuum, gasses, or draining of excess liquids. One or more of these inlet and outlet ports may be included in the device 210 and may be disposed in various locations throughout the device 210 without deviating from the intent of the present disclosure. The inlet and outlet ports may be used to maintain a certain thickness or height (used interchangeably herein) of the materials in the device 210. For instance, as shown in FIG. 19, the inert immiscible liquid 230 may have a height of inert immiscible liquid H1 in the device 210. The liquid monomer 400 may have a height of liquid monomer H2 in the device 210.

The inert immiscible liquid 230 may be delivered to the containment vessel 200 by various methods. For example, the inert immiscible liquid 230 may be delivered to the containment vessel 200 using a beaker, pipette, other suitable device, or combinations thereof.

In some embodiments, the inert immiscible liquid 230 may be injected into the containment vessel 200 using the inlet and/or outlet ports for the inert immiscible liquid P1, which may be connected to an external pump, pipette, or other delivery unit.

In some embodiments, the height of the inert immiscible liquid H1 may be controlled by delivering known mass/volume of the inert immiscible liquid 230 into a containment vessel 200 of known geometry. In some embodiments, the geometrical design of the containment vessel 200 and/or placement of the inlet and outlet ports for the inert immiscible liquid P1 or the general purpose draining port P2 can force the inert immiscible liquid height H1 to be fixed.

In some embodiments, due to the difference in surface energy between the inert immiscible liquid 230 and the liquid monomer 400, the inert immiscible liquid 230 may not fully spread (e.g., wet) onto the solid boundary 250. In such embodiments, using the inlet and/or outlet port of the inert immiscible liquid P1 can help with "wetting" of the solid boundary 250 with the inert immiscible liquid 230 and better control of the inert immiscible liquid height H1 before inserting the liquid monomer 400.

In some embodiments, during the process, the inert immiscible liquid 230 may be continuously or intermittently injected and drained using the inlet and/or outlet ports for the inert immiscible liquid P1. In some embodiments, continuously or intermittently injecting and draining the inert immiscible liquid 230 may allow for control of the temperature of the liquid monomer-inert immiscible liquid interface 460. In some embodiments, by continuously injecting inert immiscible liquid 230 of known temperature, the temperature of the inert immiscible liquid 230 may be controlled, thus also controlling the temperature at which polymerization occurs. If the inert immiscible liquid 230 is acting as a carrier of additives, for example, additives 240*i*, 240*j* as in the embodiment illustrated in FIG. 12, then a known concentration or replenishment of additives to the liquid monomer-inert immiscible liquid interface 460 may be provided.

In some embodiments, the inert immiscible liquid 230 may change to another type of inert immiscible liquid 230 using the inlet/outlet ports for the inert immiscible liquid P1. For example, in some embodiments, the process may initially use an inert immiscible liquid 230 without additives. At a later point in the process, inert immiscible liquid 230 with additives (e.g., additives 240*i*, 240*j*) may be used.

The liquid monomer 400 may be delivered to the containment vessel 200 by various methods. For instance, in some embodiments, the liquid monomer 400 may be delivered to the containment vessel 200 by directly pouring the liquid monomer 400 into the containment vessel 200 using a beaker, pipette, other suitable device, or combinations thereof. In some embodiments, the liquid monomer 400 may be delivered to the containment vessel 200 by injecting the liquid monomer using inlet/outlet ports for the liquid monomer P3 that may be connected to an external pump, pipette, or other delivery unit.

During the process, the liquid monomer 400 may be continuously or intermittently injected and drained. In some embodiments, the inlet and/or outlet ports for the liquid monomer P3 may be used to inject and/or drain the liquid monomer 400. In some embodiments, the type of liquid monomer 400 may be change to another type of liquid monomer 400. For example, in some embodiments, the process may start with a "green" liquid monomer 400, thus forming a green solid polymer 450. At a later point in the process, the liquid monomer 400 may be changed to a "blue" liquid monomer 400, thus forming a blue solid polymer 450.

Accordingly, the resulting 3D object 600 may contain multiple types of materials, with different properties and configurations.

The present device 210 may include various inlet and outlet ports (e.g., inlet and outlet ports P1-P4 shown in FIG. 19). The inlet and outlet ports may be used for various types of functions. For instance, the inlet and/or outlet ports may be used to inject inert immiscible liquid 230 and/or liquid monomer 400. For instance, in some embodiments, the inlet and/or outlet ports may be used to drain excess inert immiscible liquid 230 and/or liquid monomer 400. In some embodiments, the inlet and/or outlet ports may be used to increase the pressure in the containment vessel 200 with gas (e.g., with nitrogen, argon, or other gas), for example using general purpose inlet and outlet port for other components P4. In some embodiments, the inlet and/or outlet ports may be used to decrease the pressure in the containment vessel 200 by connection to vacuum, for example using general purpose inlet and outlet port for other components P4. In some embodiments, the inlet and/or outlet ports may be used to forcefully inject or dissolve additives (e.g., additives 240*i*, 240*j*), such as gas, into the inert immiscible liquid 230 and/or liquid monomer 400. For example, in some embodiments, a general inlet/outlet port may be placed below the height of the inert immiscible liquid 230. Nitrogen gas may be injected into this port so that the overall concentration of nitrogen in the inert immiscible liquid 230 may increase and the overall concentration of oxygen decrease. Such configuration may result in a faster reaction rate since oxygen may act as a polymerization inhibitor.

The number and location of inlet and outlet ports may vary. In some embodiments, the placement of the inlet/outlet ports may vary. For instance, inlet and/or outlet ports may be located in the containment vessel 200, solid boundary 250, substrate 300, combinations thereof, or any other suitable location. In some embodiments, the number of inlet/outlet ports may vary. In some embodiments, the inlet and outlet ports may be utilized continuously or intermittently during the process to control the process parameters any time during the fabrication of the 3D object 600. More details regarding the inlet and outlet ports are incorporated herein by reference to U.S. Provisional No. 62/616,671, filed Jan. 12, 2018, which is incorporated in its entirety herein. For instance, the inlet and outlet ports may be holes, channels, or other flowpaths for the fluids in the device 210 to travel. The inlet and outlet ports may be disposed in the containment vessel 200 (e.g., in one or more walls of the containment vessel 200), in the solid boundary 250, substrate 300, substrate holder 350, or otherwise disposed in the device 210.

The solid boundary 250 may provide containment and sealing of the liquid monomer 400 in the containment vessel 200. In some embodiments, the solid boundary 250 may not be needed. For example, in the embodiment illustrated in FIG. 9, a solid boundary 250 is not used.

The solid boundary 250 may allow for transmission of polymerization light 500 to allow for polymerization. As noted previously, the polymerization light 500 may be UV light or may be polymerization light 500 of any suitable wavelength.

The solid boundary 250 may be of any suitable thickness. In some embodiments, the solid boundary 250 may be a thick rigid (e.g., non-flexible) boundary can be a glass plate with a thickness of, for example, about 1 mm, about 2 mm, about 3 mm, about 4 mm, about 5 mm, etc., such as from about 1 mm to about 5 mm or about 2 mm to about 4 mm. In some embodiments, the solid boundary 250 may be a thick soft boundary, such as a glass plate with a silicone (e.g., polydimethylsiloxane (PDMS)) adhered on top. For example, the solid boundary 250 may be a glass plate with a thickness of about 1 mm and a coating of PDMS with a thickness of about 2 mm. In some embodiments, the solid boundary 250 may be thin and flexible such that it operates as a diaphragm or membrane. For example, the solid boundary 250 may be a thin flexible solid boundary (e.g., a membrane or diaphragm) made of silicone or PDMS with a thickness of about 0.5 mm, a cyclic olefin copolymer (COC) sheet with a thickness of about 100 μm, a fluorinated ethylene propylene (FEP) sheet with a thickness of about 200 μm, or combinations thereof. For example, the solid boundary 250 may be less than or equal to about 300 μm thick, less than or equal to about 200 μm thick, less than or equal to about 100 μm thick, less than or equal to about 75 μm thick, less than or equal to about 50 μm thick, less than or equal to about 25 μm thick, etc. In some embodiments, the solid boundary 250 may be permeable. For example, in some embodiments, the solid boundary 250 may be permeable to certain desired gasses, such as oxygen, air, etc.

The solid boundary 250 may move in any direction (e.g., along the x-axis and y-axis) with respect to the containment vessel 200 and/or the substrate 300. In some embodiments, the solid boundary 250 may act as a patterned photomask, for instance, when the UV polymerization light 500 source is a collimated light source. The photomask may be similar to lithography photomasks used in semiconductor processing. In some embodiments, the photomask may contain multiple patterns such that the substrate 300 can move with respect the solid boundary 250 or the solid boundary 250 can move with respect to the substrate 300 to allow exposure to different patterns at various steps in the process.

In some embodiments, the solid boundary 250 may contain embedded or printed electronics. For example, in some embodiments, an array of micro heaters (e.g., microheater 260) may be disposed on or in the solid boundary 250 to control the temperature of the process. For instance, in the embodiment illustrated in FIG. 8, a micro heater 260 was used to control the temperature of the inert immiscible liquid 230 locally. In some embodiments, the temperature over part or all of the inert immiscible liquid 230 may be controlled with heaters. For instance, heaters may be used to control the temperature generally over the entire environment of the additive manufacturing device 210.

In some embodiments, the solid boundary 250 may contain an array of spiral conductive coils to generate magnetic field. In some embodiments, the solid boundary 250 may contain an array of capacitive electrodes to generate fringe electromagnetic fields. In some embodiments, the solid boundary 250 may contain an array of electrical contacts or electrodes or embedded sensors to detect temperature, pressure, etc. The solid boundary 250 can be a Light Emitting Device (LED) or a Liquid Cristal Display (LCD) type screen that emits patterned light itself. The solid boundary 250 can include a ground glass diffuser or holographic diffuser.

Figure 38:
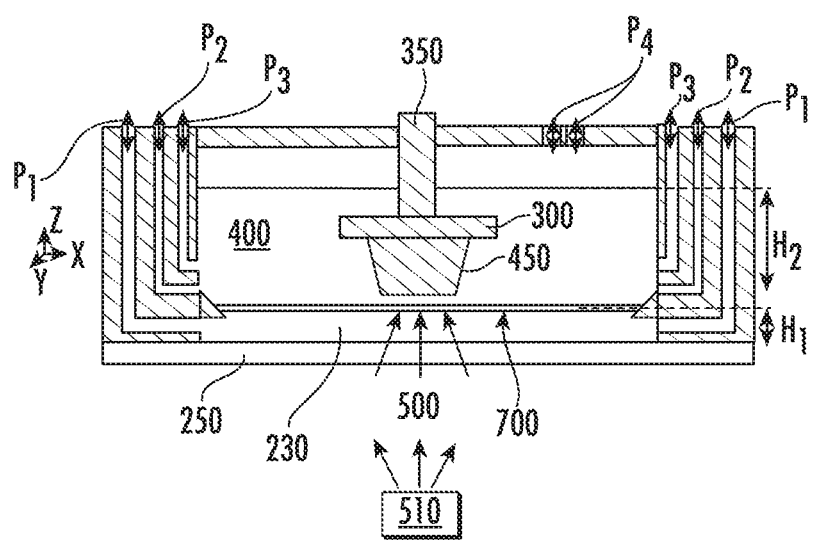
FIG. 38 illustrates a device and method for polymerization in accordance with some embodiments discussed herein.

In some embodiments, the device 210 may include a membrane disposed between the inert immiscible liquid 230 and the liquid monomer 400. FIG. 38 illustrates a device including a membrane 700 between the inert immiscible liquid 230 and the liquid monomer 400 in accordance with some embodiments disclosed herein. In the embodiment illustrated in FIG. 38, a thin membrane 700 is disposed between the inert immiscible liquid 230 and the liquid monomer 400. The membrane 700 may be permeable or porous, thus, inert immiscible liquid 230 may permeate through the membrane 700. Thus, polymerization may actually still occur at the liquid monomer-inert immiscible liquid interface 460. In some embodiment, the membrane 700 may be chosen such that only intentional or unintentional additives (e.g., additives 240i, 240j) permeate through the membrane 700. For instance, in some embodiments, oxygen from the inert immiscible liquid 230 may permeate through the membrane 700. Such oxygen may then slow down the rate of polymerization. Regardless, polymerization will still occur at the liquid monomer-inert immiscible liquid interface 460. In some embodiments, the membrane 700 may be UV transparent to allow for polymerization light 500 to pass through. For instance, the membrane 700 may be a transparent screen mesh or sieve.

Figure 36:
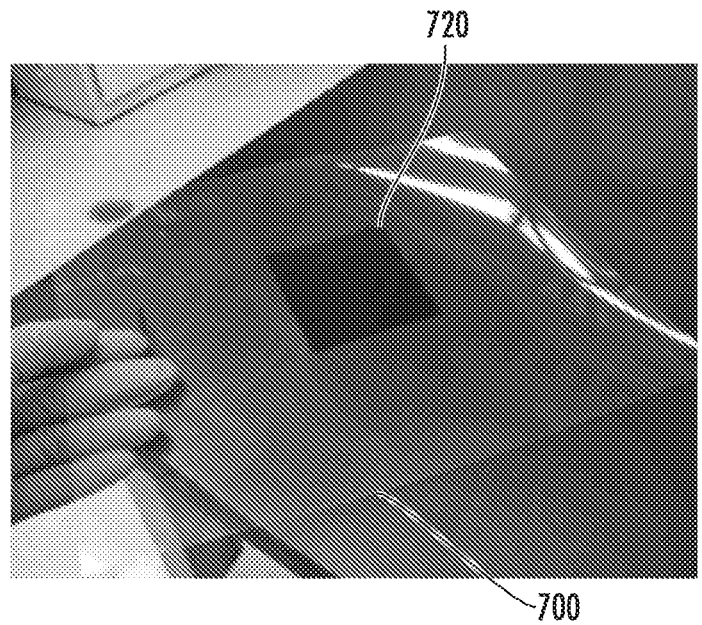
FIG. 36 shows an exemplary membrane in accordance with some embodiments discussed herein.

FIG. 36 shows an example of a membrane 700 with a printed pattern 720 on the membrane 700. The membrane 700 with the printed pattern 720 may be a flexible patterned photomask and thus, can control the formation of solid polymer 450 by controlling the exposure of polymerization light 500 to the liquid monomer 400. The membrane 700 with the printed pattern 720 may be the membrane 700 within the inert immiscible liquid 230. The membrane 700 with the printed pattern 720 may also be the solid boundary 250 disposed between the inert immiscible liquid 230 and the polymerization light 500 source (e.g., light source 510 of FIG. 4).

Figure 37:
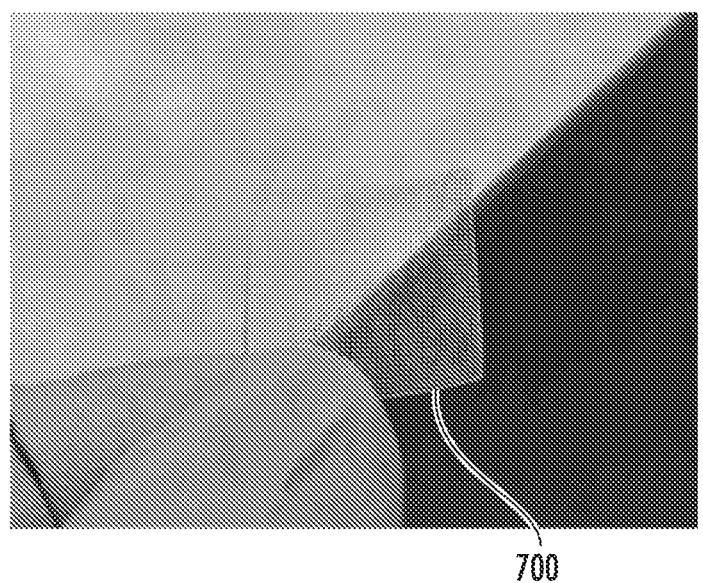
FIG. 37 shows an exemplary membrane in accordance with some embodiments discussed herein.

FIG. 37 shows an example of a thin transparent flexible membrane 700 made from a polymer. This thin flexible membrane 700 is porous and has a mesh type pattern. The membrane 700 may allow inert immiscible liquid 230 to pass through the membrane 700 to the liquid monomer 400. The membrane 700 of FIG. 37 may be used as a solid boundary 250 in a top-down orientation, but would not likely be used in a bottom-down orientation without additional support preventing inert immiscible liquid 230 from leaking from the device 210.

A membrane 700 may be used in the device 210 to control the height of inert immiscible liquid H1. In some embodiments, membrane 700 may be used as a patterned photomask, as shown for instance in FIG. 36. In some embodiments, it may be desired to use the solid boundary 250 as a photomask, but maintaining a very thin height of inert immiscible liquid H1 (e.g., below 500 μm) may be difficult to do. A membrane 700 may be used between the inert immiscible liquid 230 and the liquid monomer 400 to control the height of inert immiscible liquid H1 by changing the surface tension of the inert immiscible liquid 230. The surface tension of the inert immiscible liquid 230 may be changed because the membrane 700 may operate as a "wetting" surface for the inert immiscible liquid 230. Polymerization may occur proximate to the membrane 700, but still at the liquid monomer-inert immiscible liquid interface 460.

The membrane 700 may help separation between the liquid monomer 400 and the inert immiscible liquid 230. The membrane 700 may push the inert immiscible liquid 230 down while also allowing a small portion of the inert immiscible liquid 230 to permeate through the membrane 700. Polymerization may then occur at the liquid monomer-inert immiscible liquid interface 460.

In some embodiments, a top-down orientation may be desired; however, the inert immiscible liquid 230 may have a higher density than the liquid monomer 400. A membrane 700 may be used to contain the inert immiscible liquid 230 above the liquid monomer 400 and prevent the inert immiscible liquid 230 from leaking to the bottom of the device 210.

In some embodiments, the membrane 700 may act as a selective barrier to allow additives (e.g., additives 240i, 240j) in the inert immiscible liquid 230 to permeate through the inert immiscible liquid 230 to modify polymerization at the liquid monomer-membrane interface 710.

In some embodiments, the membrane 700 may be thin and flexible (e.g., have the ability to deform). In some embodiments, the membrane 700 may be transparent to the wave light of light polymerization is initiated. In some embodiments, the membrane 700 may be permeable and/or porous. For example, the membrane 700 may be permeable (e.g., have the ability for certain selective components to pass through the membrane 700). In some embodiments, the membrane 700 may be porous (e.g., contain holes or voids such that the membrane 700 is not as selective as a membrane 700 that is permeable).

In some embodiments, a plurality of membranes 700 may be included in the device 210 and may be stacked. For instance, similar to FIG. 11 where a plurality of inert immiscible liquids 230 are included in the device 210, a plurality of membranes 700 may be included in the device 210, such as within the inert immiscible liquid 230.

In some embodiments, the membrane 700 may be a patterned photomask or fully transparent. In some embodiments, the membrane 700 may contain embedded or printed electronics (e.g., microheaters).

Figure 20:
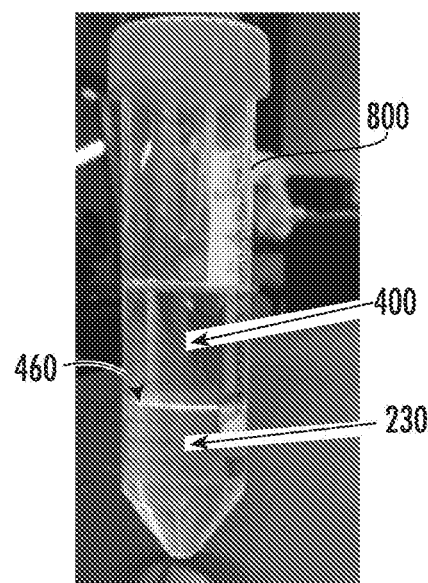
FIG. 20 shows an exemplary liquid-liquid interface in accordance with some embodiments discussed herein.

FIG. 20 shows an example of a liquid monomer 400 and inert immiscible liquid 230 in a vial 800. In particular, FIG. 20 illustrates the liquid monomer-inert immiscible liquid interface 460 between a liquid monomer 400 and an inert immiscible liquid 230 as disclosed herein. Because the inert immiscible liquid 230 has a higher density than the liquid monomer 400, the inert immiscible liquid 230 is disposed on the bottom of the vial 800.

Figures 21A, 21B:
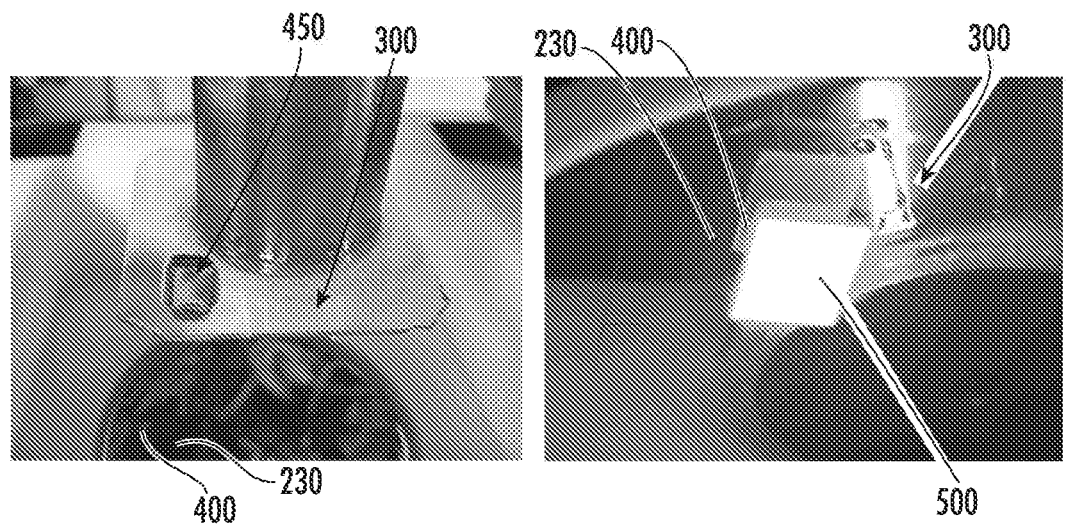
FIGS. 21(a) and 21(b) show the fabrication of an exemplary 3D object in accordance with some embodiments discussed herein.

FIGS. 21(a) and 21(b) show an experimental example of fabricating a 3D object 600 using polymerization at the liquid monomer-inert immiscible liquid interface 460. In particular, FIGS. 21(a) and 21(b) show an experimental example of the embodiment illustrated in FIG. 6. FIG. 21(a) is a view from the top of a substrate 300 and FIG. 21(b) is a view from the bottom of a containment vessel 200 viewing through the solid boundary 250. Because the inert immiscible liquid 230 is transparent, the inert immiscible liquid 230 cannot be distinguished from the liquid monomer 400 in FIGS. 21(a) and 21(b) but is positioned below the liquid monomer 400.

Figure 22:
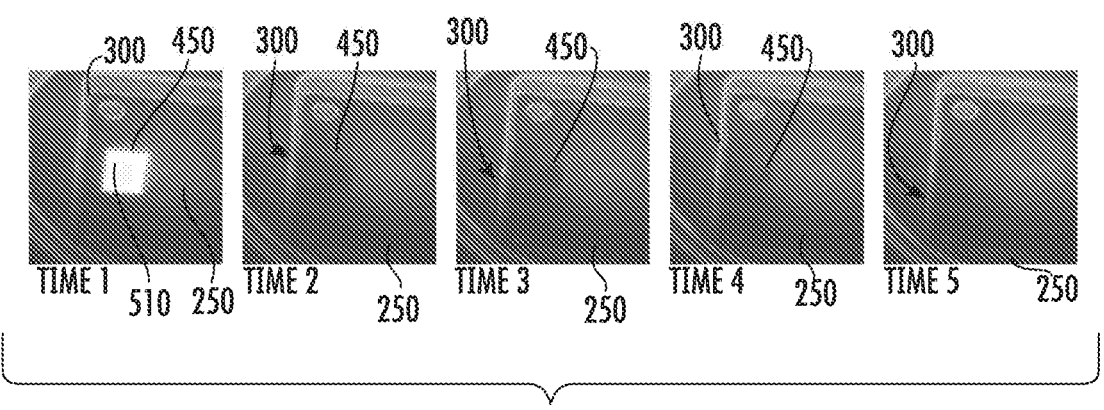
FIG. 22 shows a method of removing a solid polymer in accordance with some embodiments discussed herein.

FIG. 22 shows an experimental example of the separation process of the solid polymer 450 from the liquid monomer-inert immiscible liquid interface 460 as described in FIG. 14, FIG. 15, and herein. As shown in FIG. 22, as the substrate 300 is moved away from the liquid monomer-inert immiscible liquid interface 460, the solid polymer 450 is moved away from the inert immiscible liquid 230.

Figures 23A, 23B, 23C:
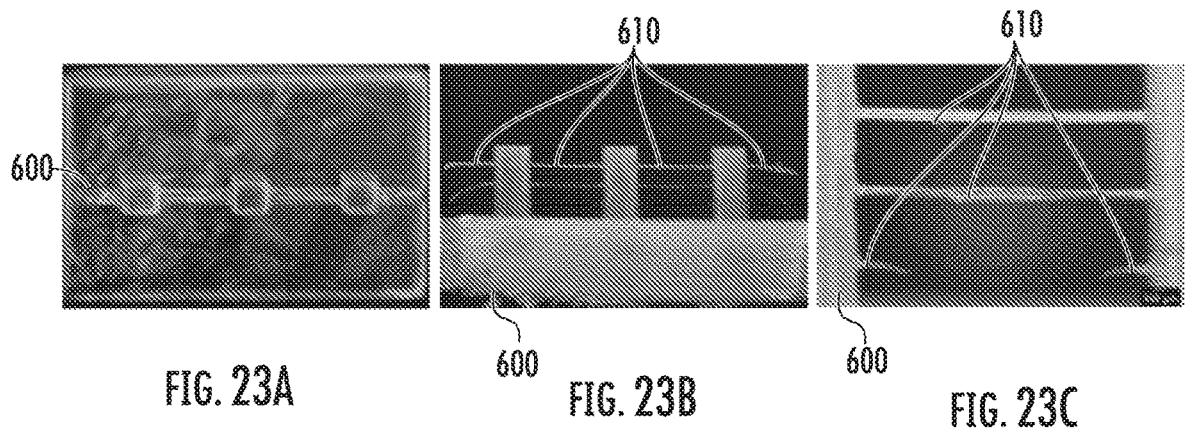
FIGS. 23(a)-23(c) show exemplary 3D samples formed in accordance with some embodiments discussed herein.

FIGS. 23(a)-23(c) shows an example of a 3D object 600 fabricated using embodiments disclosed herein. The 3D object 600 in FIGS. 23(a)-23(c) includes several overhanging features 610. FIGS. 23(a)-23(c) show different views of the 3D object 600. In particular, FIG. 23(a) shows a top view of the 3D object 600. FIG. 23(b) shows a side view of the 3D object 600. FIG. 23(c) shows an enlarged side view of the 3D object 600. Because the separation of solid polymer 450 occurs from the liquid monomer-inert immiscible liquid interface 460, instead of a solid interface 425, the disclosed device and method allow for fabrication of 3D objects 600 with very small and thin overhanging feature 610 without any support structures, which may not be possible with most prior art methods.

Figure 24:
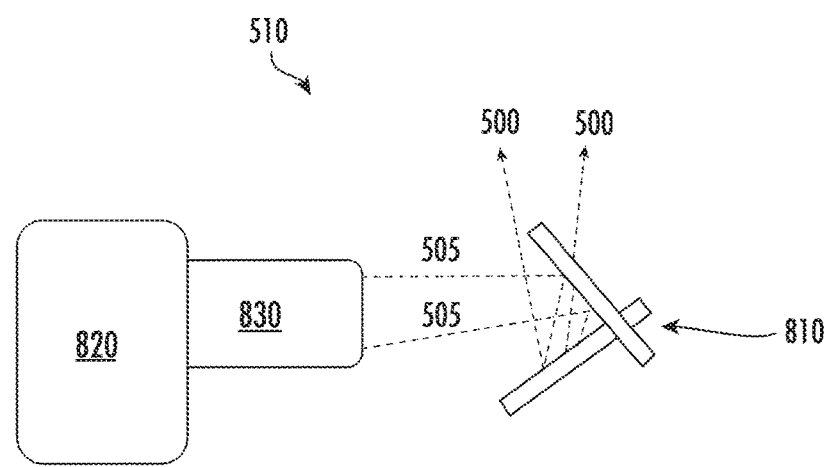
FIG. 24 illustrates a light source of the device for polymerization in accordance with some embodiments discussed herein.

FIG. 24 shows a light source 510 of the device 210 for polymerization according to an embodiment of the present disclosure. Referring to FIG. 24, the light source 510 is a DPL 820 fitted with a projection lens 830. The DLP® 820 emits a light 505 through a projection lens 830. Galvo scanning mirrors 810 reflect the emitted light 505 and provide the projected UV polymerization light 500. The galvo scanning mirrors 810 allow XY positioning of projected polymerization light 500 and may be used with a laser light instead of DLP® projection light.

Figure 25:
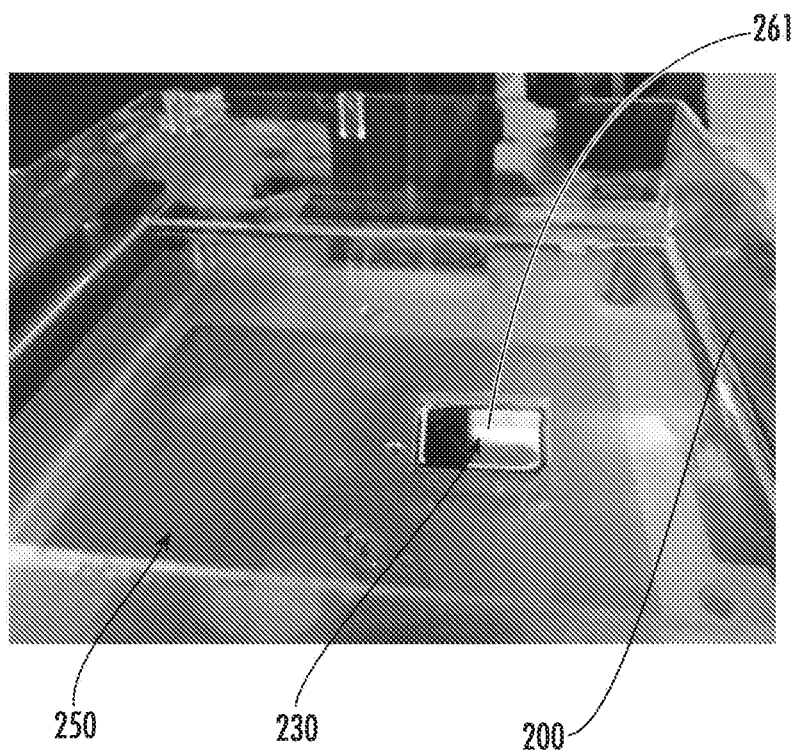
FIG. 25 shows an example of a liquid holding tank including an inert liquid in accordance with some embodiments discussed herein.
Figure 26:
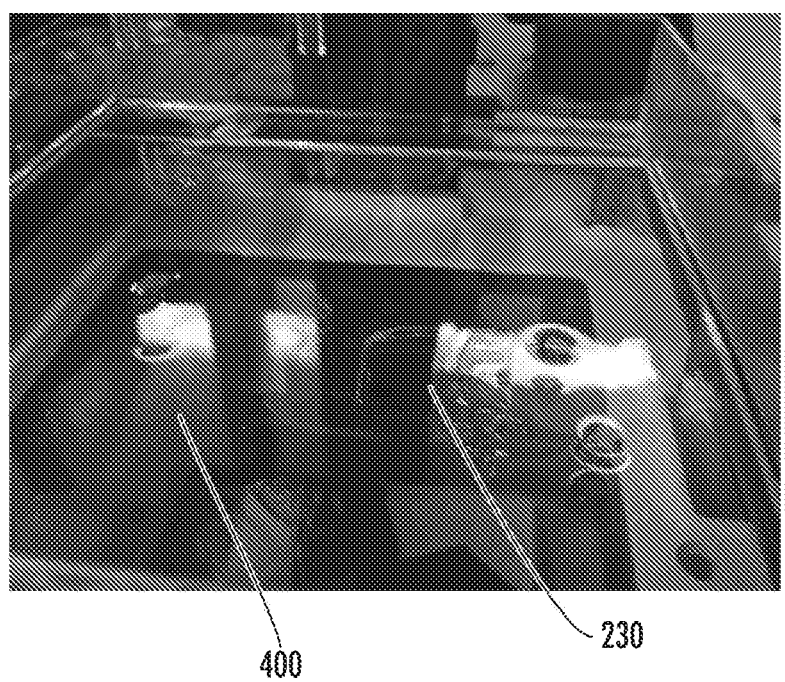
FIG. 26 shows an example of a liquid holding tank including a liquid monomer in accordance with some embodiments discussed herein.

FIG. 25 shows an example of a containment vessel 200 including an inert immiscible liquid 230 according to an embodiment of the present disclosure, and FIG. 26 shows an example of a containment vessel 200 including a liquid monomer 400 according to an embodiment of the present disclosure. Referring to FIG. 25, the containment vessel 200 has a solid boundary 250 at a bottom of the containment vessel 200 and the inert immiscible liquid 230 is placed on a top of the solid boundary 250. In the embodiment illustrated in FIG. 25, the inert immiscible liquid 230 is disposed in a groove 260 within the containment vessel 200. The liquid monomer 400 is then poured into the containment vessel 200 as shown in FIG. 26. Referring to FIG. 26, the inert immiscible liquid 230 stays below the liquid monomer 400 because the inert immiscible liquid 230 has a higher density than the density of the liquid monomer 400.

Figure 27:
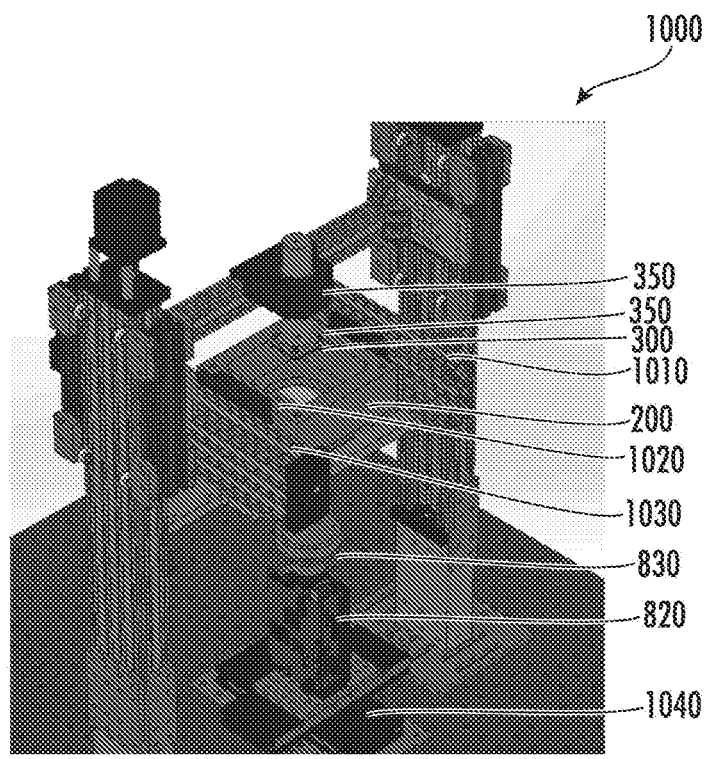
FIG. 27 is a computer-aided-design (CAD) model of a microstereolithography system for polymerization in accordance with some embodiments discussed herein.
Figure 28:
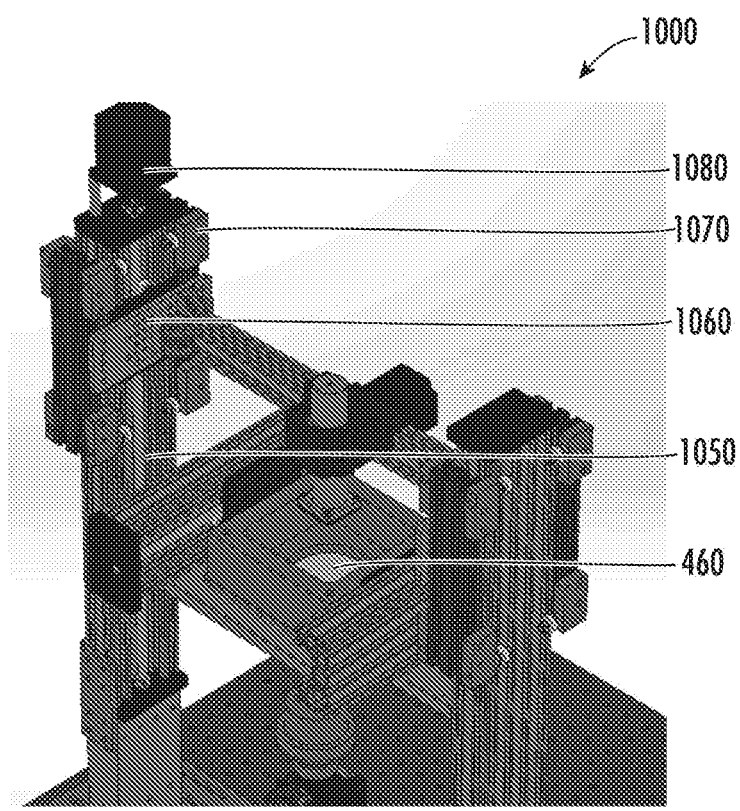
FIG. 28 is a CAD model of a microstereolithography system for polymerization in accordance with some embodiments discussed herein.

FIGS. 27 and 28 are CAD models for a microstereolithography system for polymerization according to an embodiment of the present disclosure. Referring to FIGS. 26 and 27, the system 1000 comprises a substrate 300 and a substrate holder 350 securing the substrate 300 in a fixed desired position. The substrate holder 350 allows 3 axes (X, Y, and Z) movement of the substrate 300 during setup for auto leveling and fixing the final position prior to fabrication. The substrate 300 can have electrical potential, thereby inducing adhesion of growing solid polymer 450 onto the substrate 300, and reducing stiction at the solid boundary 450. The substrate 300 and the substrate holder 350 can comprise sensors; such as pressure sensor, force sensor, temperature sensor, accelerometer, and position sensor to detect various fabrication conditions; and actuators.

The system 1000 shown in FIGS. 27 and 28 includes a lead screw 1050, a stepper motor 1080, Z-axis wheeled rail support system 1070 for reducing deflections, and Z-axis rail movement system 1060 that enable the substrate holder 350 to move in a vertical direction along a Z-axis.

The system 1000 shown in FIGS. 27 and 28 also includes a containment vessel 200 configured to be attached to a bath sliding rail 1010, a bath detachment unit 1020 between the containment vessel 200 and the bath sliding rail 1030, and a bath sliding rail motor 1030 for moving the containment vessel 200. The system 1000 further includes a projection lens 830, a DLP® projection system 820 for providing a polymerization light 500, and two axes (X and Y) linear stage 1040.

Figure 29:
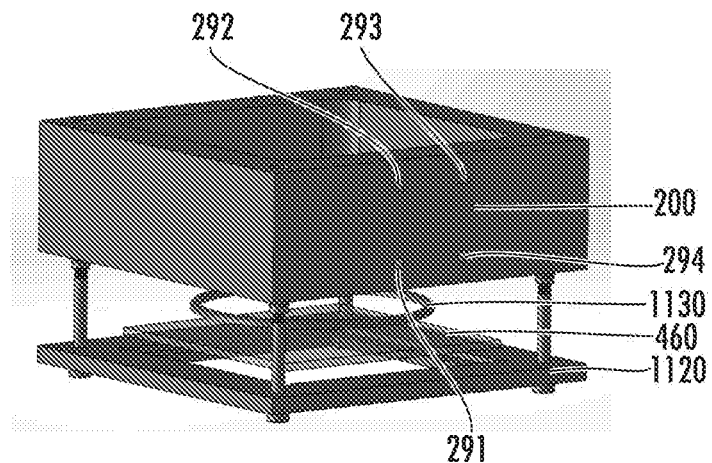
FIG. 29 is a CAD model of a liquid holding tank for microstereolithography system for polymerization in accordance with some embodiments discussed herein.
Figure 30:
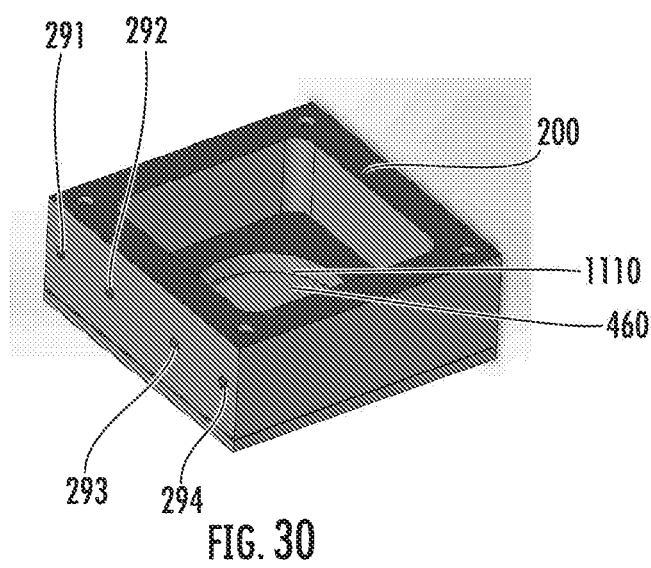
FIG. 30 is a CAD model of a liquid holding tank for microstereolithography system for polymerization in accordance with some embodiments discussed herein.

FIGS. 29 and 30 show CAD models of a containment vessel 200 for microstereolithography for polymerization according to an embodiment of the present disclosure. Referring to FIGS. 29 and 30, the containment vessel 200, which is configured to contain liquid monomer 400 and secure a solid boundary 250, can be modular and the modular comprises a sealing O-ring 1130, and a solid boundary clamping plate 1120, providing flexibility in choosing and replacing the solid boundary 250. The containment vessel 200 can include sensors, such as pressure sensor, force sensor, displacement sensor, temperature sensor, accelerometer, or combinations thereof. In addition, the containment vessel 200 can further include actuators such as piezoelectric actuator and motors. In the embodiment illustrated in FIGS. 29 and 30, inlet/outlet ports 291-294 are illustrated which may be used to drain fluid from the containment vessel 200.

Figure 31:
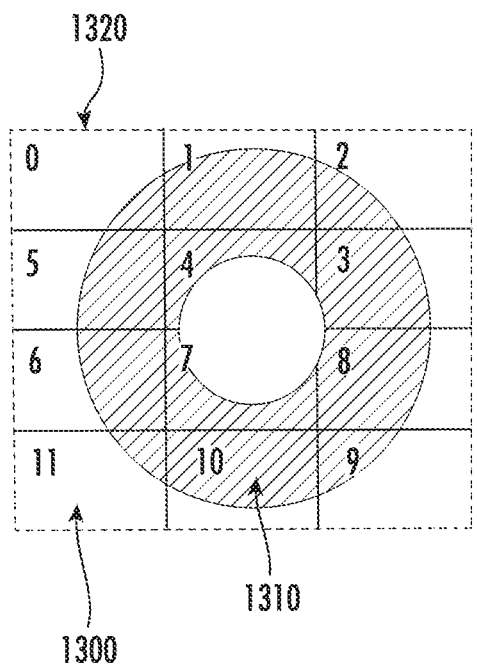
FIG. 31 is a schematic of an image stitching for microstereolithography system for polymerization in accordance with some embodiments discussed herein.

FIG. 31 is a schematic of an image stitching for microstereolithography for polymerization in accordance with some embodiments discussed herein. Referring to FIG. 31, the liquid monomer 400 is polymerized by sequentially exposing unit areas of exposure 1320 to polymerization light 500 (e.g., moving from unit area of exposure 1320 numbered 0 to unit area of exposure 1320 numbered 11), and thus, a high resolution large area image can be manufactured by the image stitching method stitching multiple small area high resolution images into a larger area image. As shown in FIG. 31, the unit areas of exposure 1320 include un-polymerized monomer area 1300 and polymerized monomer area 1310. In an embodiment, the two axes linear stage of FIG. 27 on which the DPL projection system 820 and the projection lens 830 are attached moves in the X axis and Y axis, thereby achieving image stitching. In another embodiment, the XY galvo scanning mirrors 810 of FIG. 24 change the direction of projected polymerization light 500, thereby accomplishing image stitching. In yet another embodiment, the movement of the substrate 300 or the containment vessel 200 in two axes (X and Y) with respect to the projected polymerization light 500 provides image stitching.

Figure 32:
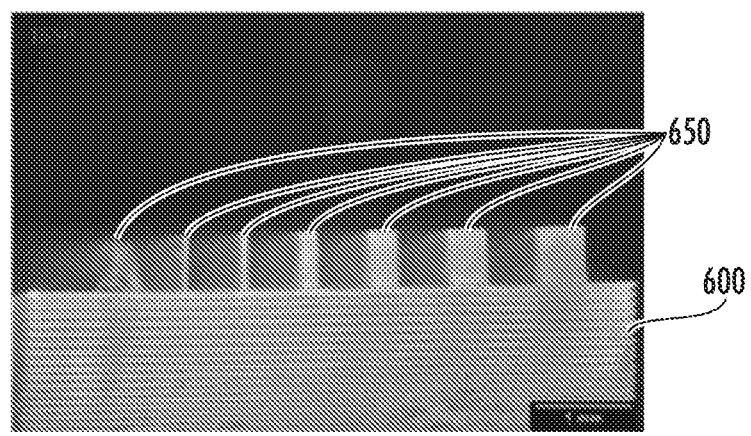
FIG. 32 illustrates high aspect ratio features prepared in accordance with some embodiments discussed herein.

FIG. 32 shows high aspect ratio features prepared in accordance with some embodiments discussed herein. In particular, FIG. 32 illustrates high aspect ratio features 650 of a 3D object 600 fabricated using a liquid monomer-inert immiscible liquid interface 460 as discussed herein. The high aspect ratio features 650 are an array of lines with varying widths to show the ability of the present device and method to achieve very tall lines that have small widths.

Figure 33:
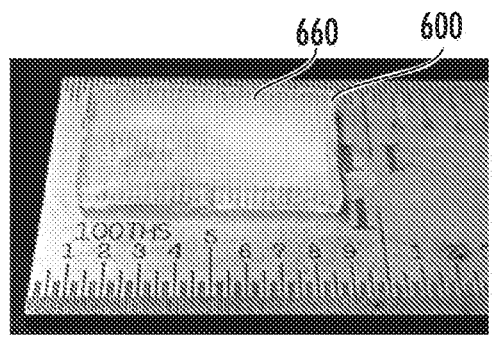
FIG. 33 shows an example of a solid polymer prepared in accordance with some embodiments discussed herein.

FIG. 33 shows an example of a 3D object 600 prepared in accordance with some embodiments discussed herein. In particular, FIG. 33 illustrates the fabrication of a large area, high resolution 3D object 600 using scanning projection (e.g., stitching) and polymerization at the liquid monomer-inert immiscible liquid interface 460. The 3D object 600 has an ordered array of channels 660 (e.g., holes) about 500 μm in diameter. The 3D object 600 has a large area with very small features that are array of 500 μm holes. As discussed previously, as surface area increases, stiction forces may also increase. The present device and method may allow for the fabrication of large area objects without concern for stiction.

Figures 34A, 34B:
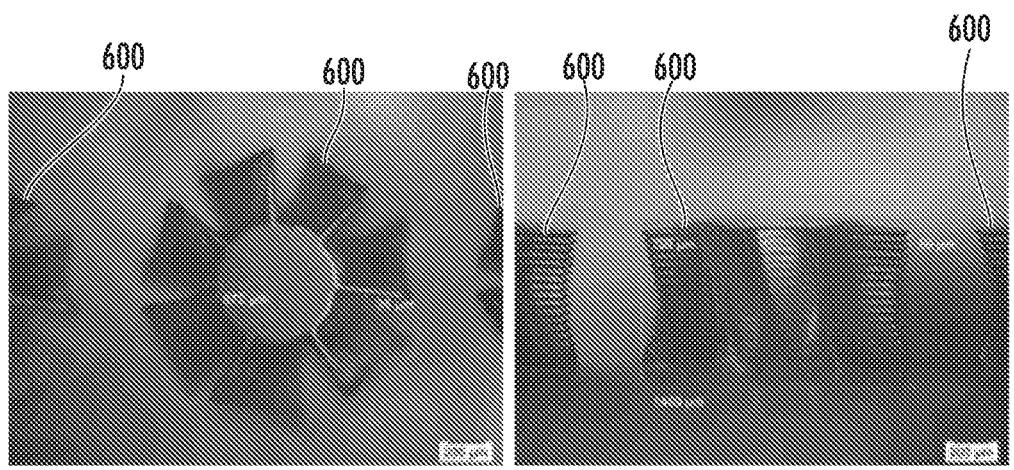

FIGS. 34(a) and 34(b) show examples of 3D objects 600 prepared in accordance with some embodiments discussed herein. In particular, FIGS. 34(a) and 34(b) show different views of complex 3D objects 600 prepared using a liquid monomer-inert immiscible liquid interface 460 as discussed herein and microstereolithography with dynamic pattern projection as discussed herein.

Figure 35:
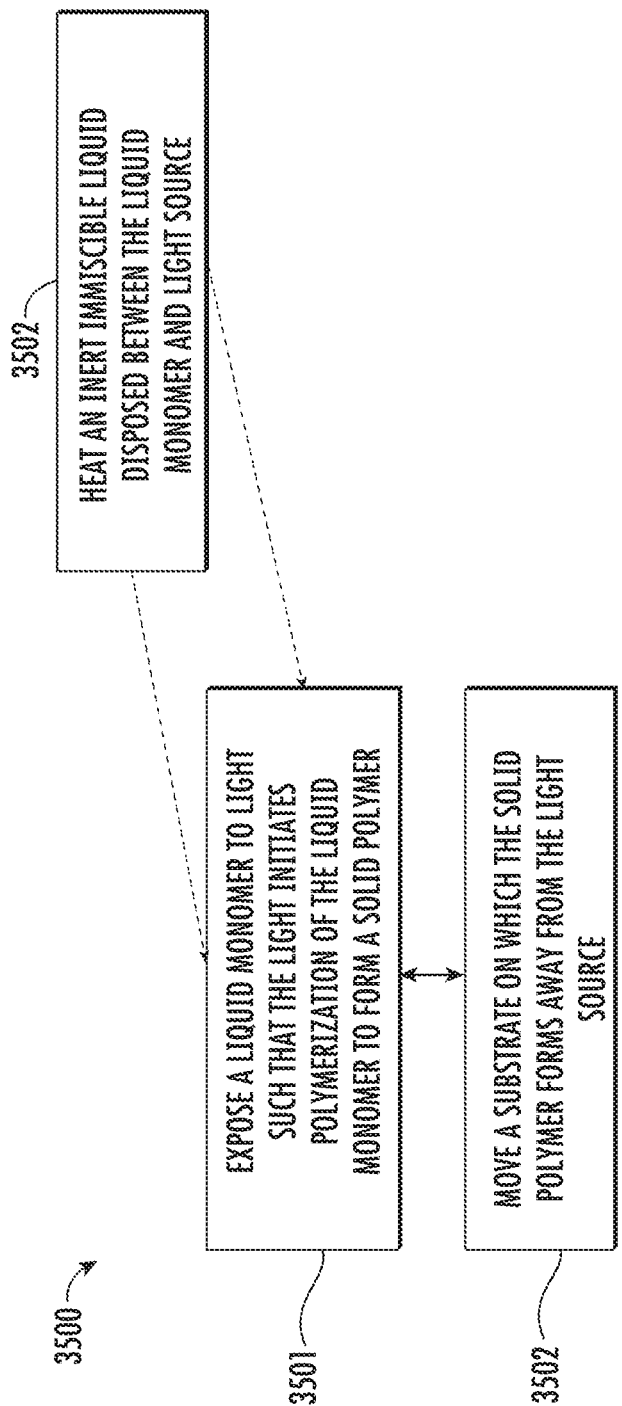
FIG. 35 is a flowchart for a method of preparing solid polymers in accordance with some embodiments discussed herein.

FIG. 35 is a flowchart for a method of preparing 3D objects 600 in accordance with some embodiments discussed herein. In particular, FIG. 35 illustrates a method 2000 that includes method 3500 for forming a 3D object 600 using polymerization as disclosed herein. In particular, method 3500 includes exposing a liquid monomer to light such that the light initiates polymerization of the liquid monomer to form a solid polymer 3501 and moving a substrate on which the solid polymer forms away from the light source 3502. The light may be polymerization light 500 as discussed herein and moving the substrate during operation 3502 may occur after or while exposing the liquid monomer to light in operation 3501. An inert immiscible liquid is disposed between the liquid monomer 400 and the light source 510 as discussed herein. The method 3500 may also include heating the inert immiscible liquid disposed between the liquid monomer and the light source 3502 prior to or while exposing the liquid monomer to light in operation 3501.

The present device and method allow for polymerization at a liquid monomer-inert immiscible liquid interface 460 to prepare structured 3D objects 600. The liquid monomer-inert immiscible liquid interface 460 is used to fabricate structured objects with complex 3D geometries. The fabrication of the 3D object 600 occurs by spatially selective reaction. For instance, patterned UV polymerization light 500 may be used for spatially selective reaction. The UV polymerization light 500 causes polymerization of the liquid monomer 400 to occur thus forming a solid polymer 450.

The subject invention includes, but is not limited to, the following exemplified embodiments.

Embodiment 1

A device for additive manufacturing to form a 3D object, comprising:
an inert immiscible liquid disposed in a containment vessel; and
a liquid monomer disposed adjacent to the inert immiscible liquid;
wherein the device is configured such that polymerization light from a light source polymerizes the liquid monomer to form a solid polymer at a liquid monomer-inert immiscible liquid interface formed between the liquid monomer and the inert immiscible liquid.

Embodiment 2

The device according to embodiment 1, wherein inert immiscible liquid is transparent to the light.

Embodiment 3

The device according to any of embodiments 1-2, wherein the containment vessel includes a solid boundary and the inert immiscible liquid is disposed between the solid boundary and the liquid monomer on at least a portion of the containment vessel.

Embodiment 4

The device according to any of embodiments 1-3, wherein the containment vessel comprises a substrate disposed in the containment vessel such that the liquid monomer forms the solid polymer over the substrate when exposed to light from the light source.

Embodiment 5

The device according to any of embodiments 1-4, wherein a density of the inert immiscible liquid is different than a density of the liquid monomer.

Embodiment 6

The device according to embodiment 3, wherein the solid boundary is a patterned photomask, liquid crystal display (LCD), light-emitting diode (LED), transparent solid boundary, or combinations thereof.

Embodiment 7

The device according to any of embodiments 1-6, wherein polymerization of the liquid monomer is spatially controlled so that a portion of the liquid monomer is polymerized to the solid polymer.

Embodiment 8

The device according to any of embodiments 1-7, further comprising a membrane disposed between at least part of the inert immiscible liquid and the liquid monomer and configured such that polymerization of the liquid monomer occurs at the liquid monomer-inert immiscible liquid interface.

Embodiment 9

The device according to any of embodiments 1-8, wherein the inert immiscible liquid comprise one or more additives, wherein the one or more additives modify polymerization of the liquid monomer, polymerization of the inert immiscible liquid, or both.

Embodiment 10

The device according to any of embodiments 1-9, wherein the inert immiscible liquid comprises one or more additives, wherein the one or more additives are incorporated into the solid polymer when the liquid monomer is polymerized to the solid polymer when exposed to light emitted from the light source.

Embodiment 11

The device according to any of embodiments 1-10, wherein a gradient of miscibility forms at the inert immiscible liquid and liquid monomer.

Embodiment 12

The device according to any of embodiments 1-11, wherein the inert immiscible liquid is a different liquid than the liquid monomer.

Embodiment 13

The device according to any of embodiments 1-12, wherein the inert immiscible liquid comprises additives that modify properties of the inert immiscible liquid and the liquid monomer, the interaction between the inert immiscible liquid and the liquid monomer, or combinations thereof, such as miscibility, interfacial properties such as surface tension at the liquid monomer-inert immiscible liquid interface, optical properties such as transparency to UV light, thermal conduction, or combinations thereof of the inert immiscible liquid and the liquid monomer.

Embodiment 14

The device according to any of embodiments 1-13, further comprising a plurality of inert immiscible liquids.

Embodiment 15

The device according to any of embodiments 1-14, further comprising at least one inlet/outlet port defined in the containment vessel, solid boundary, or combinations thereof for introducing and/or draining liquid monomer, inert immiscible liquid, additives, gases, vacuum, or both into the device.

Embodiment 16

The device according to any of embodiments 1-15, further comprising a heater or cooler disposed in the device to modify a temperature of the inert immiscible liquid, to modify a temperature of the liquid monomer, to modify polymerization of the liquid monomer, or combinations thereof.

Embodiment 17

A method of additive manufacturing to form a 3D object, comprising:
exposing a liquid monomer to polymerization light such that the polymerization light initiates polymerization of the liquid monomer to form a solid polymer,
wherein the polymerization light travels through an inert immiscible liquid disposed between the liquid monomer and a light source emitting the light and polymerization occurs at a liquid monomer-inert immiscible liquid interface formed between the liquid monomer and the inert immiscible liquid.

Embodiment 18

The method according to embodiment 17, further comprising moving a substrate on which the solid polymer forms away from the light source while exposing the liquid monomer to light such that the polymerization light initiates polymerization of the liquid monomer to form the solid polymer.

Embodiment 19

The method according to any of embodiments 17-18, further comprising heating the inert immiscible liquid to form a portion of inert immiscible liquid in a liquid phase prior to or while exposing the liquid monomer to light such that the polymerization light initiates polymerization of the liquid monomer to form the solid polymer.

Embodiment 20

A 3D object formed using the device of any of embodiments 1-16.

Embodiment 21

A 3D object formed using the method of any of embodiments 17-19.

A greater understanding of the present disclosure and it many advantages may be had from the disclosed examples and embodiments, given by way illustration. The examples and embodiments show some of the methods, applications, embodiments and variants of the present disclosure. They are, of course, not to be considered as limiting the disclosure. It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A device for additive manufacturing to form a 3D object, the device comprising:
a transparent solid boundary disposed in a containment vessel;
a mixture of a plurality of inert immiscible liquids disposed on a first surface of the transparent solid boundary, the first surface of the transparent solid boundary being opposite a second surface of the transparent solid boundary that is adjacent to a light source, the mixture of the plurality of inert immiscible liquids being transparent to polymerization light emitted from the light source;
a patterned membrane photomask disposed in the inner volume of the containment vessel such that a first surface of the patterned membrane photomask is immediately adjacent to some or all of the mixture of the plurality of inert immiscible liquids, the patterned membrane photomask being selectively permeable to the mixture of the plurality of inert immiscible liquids, wherein the patterned membrane photomask is further configured to control where polymerization occurs, and wherein the patterned membrane photomask comprises multiple different patterns configured to allow for selective exposure of the light emitted from the light source into the containment vessel; and
a liquid monomer disposed in the inner volume of the containment vessel adjacent to a second surface of the patterned membrane photomask opposite the first surface of the patterned membrane photomask that is immediately adjacent the mixture of the plurality of inert immiscible liquids,
wherein the mixture of the plurality of inert immiscible liquids is chemically inert with respect to the liquid monomer,
wherein the mixture of the plurality of inert immiscible liquids comprises liquids that are different than the liquid monomer,
wherein the device is configured such that when the first surface of the patterned membrane photomask is disposed immediately adjacent to some or all of the mixture of the plurality of inert immiscible liquids, at least a portion of the mixture of the plurality of immiscible liquids is communicated from the first surface of the patterned membrane photomask, through the patterned membrane photomask to the second surface of the patterned membrane photomask, to form a liquid monomer-inert immiscible liquid mixture interface between the first surface of the patterned membrane photomask and the liquid monomer, and
wherein the device is configured such that the polymerization light emitted from the light source passes through the transparent solid boundary, through the first one or more portions of the patterned membrane photomask, through the mixture of the plurality of inert immiscible liquids, and polymerizes a portion of the liquid monomer to form the one or more solid polymer layers of the 3D object at the liquid monomer-inert immiscible liquid mixture interface formed between the liquid monomer and the mixture of the plurality of inert immiscible liquids.

2. The device of claim 1, wherein the mixture of the plurality of inert immiscible liquids is disposed between the transparent solid boundary and the liquid monomer on at least a portion of the containment vessel.

3. The device of claim 1, wherein a density of the mixture of the plurality of inert immiscible liquids is different than a density of the liquid monomer.

4. The device of claim 2, wherein the transparent solid boundary comprises one or more of: a liquid crystal display (LCD) or a light-emitting diode (LED).

5. The device of claim 1, wherein polymerization of the liquid monomer is spatially controlled so that the portion of the liquid monomer is polymerized to form the one or more solid polymer layers of the 3D object based on one or more of: a pattern of the polymerizing light as emitted from the light source, a photomask pattern of the patterned membrane photomask, a composition of the liquid monomer, or a composition of the mixture of the plurality of inert immiscible liquids.

6. The device of claim 1, wherein the mixture of the plurality of inert immiscible liquids comprises one or more additives, and wherein the one or more additives are configured to modify one or more of: a rate of polymerization of the liquid monomer or a rate of polymerization of the mixture of the plurality of inert immiscible liquids.

7. The device of claim 1, wherein the mixture of the plurality of inert immiscible liquids comprises one or more additives, and wherein the one or more additives are incorporated into the one or more solid polymer layers of the 3D object when the portion of the liquid monomer is polymerized upon exposure to the polymerizing light emitted from the light source.

8. The device of claim 1, wherein a miscibility gradient is formed at or around the liquid monomer-inert immiscible liquid mixture interface between the liquid monomer and the portion of the mixture of the plurality of inert immiscible liquids communicated through the patterned membrane photomask.

9. The device of claim 1, wherein the mixture of the plurality of inert immiscible liquids comprises additives that modify properties of the mixture of the plurality of inert immiscible liquids and properties of the liquid monomer or interactions between the mixture of the plurality of inert immiscible liquids and the liquid monomer.

10. The device of claim 1, further comprising:
at least one of an inlet port or an outlet port defined in the containment vessel or the transparent solid boundary, the at least one inlet port or an outlet port being operable for allowing communication of fluids into or out of the containment vessel of the device.

11. The device of claim 1, further comprising:
a heater or a cooler disposed in or adjacent to the device, the heater or the cooler being configured to modify one or more of: a temperature of the mixture of the plurality of inert immiscible liquids, the temperature of the liquid monomer, or a rate of polymerization of the liquid monomer.

12. The device of claim 1, wherein the mixture of the plurality of inert immiscible liquids is at least partially disposed within a groove or a recessed portion within the containment vessel.

13. The device of claim 1, wherein the mixture of the plurality of inert immiscible liquids comprises a stack of inert immiscible liquids.

14. The device of claim 1, wherein the mixture of the plurality of inert immiscible liquids comprises one or more fluorinated solvents.

15. The device of claim 1, further comprising:
a carrier structure disposed within the inner volume of the containment vessel within the liquid monomer and a distance above the patterned membrane photomask,
wherein the portion of the liquid monomer is a first portion of the liquid monomer and the portion of the solid polymer is a first portion of the solid polymer, and
wherein the one or more first solid polymer layers of the 3D object are formed against and adhere to the carrier structure.

16. The device of claim 15, wherein the device is configured to, after the first portion of the solid polymer is formed and adheres to the carrier structure, move the carrier structure an additional distance above the patterned membrane photomask, allow an additional portion of the mixture of the plurality of inert immiscible liquids to be communicated through the patterned membrane photomask to a location immediately adjacent a remaining portion of the liquid monomer to form a subsequent liquid monomer-inert immiscible liquid mixture interface, and cause additional polymerization light to pass through the transparent solid boundary, through the patterned membrane photomask, and through the mixture of the plurality of inert immiscible liquids, and to polymerize a second portion of the liquid monomer at the subsequent liquid monomer-inert immiscible liquid mixture interface to form one or more second solid polymer layers of the 3D object against and adhering to one or both of the carrier structure or the first one or more solid polymer layers of the 3D object.

17. A device for additive manufacturing to form a 3D object, the device comprising:
a transparent solid boundary disposed in a containment vessel;
a mixture of multiple inert immiscible liquids disposed on a first surface of the transparent solid boundary, the first surface of the transparent solid boundary being opposite a second surface of the transparent solid boundary that is adjacent to a light source, the mixture of multiple inert immiscible liquids being transparent to a polymerizing light emitted from the light source;
a patterned membrane photomask disposed in the inner volume of the containment vessel such that a first surface of the patterned membrane photomask is immediately adjacent to some or all of the mixture of multiple inert immiscible liquids, the patterned membrane photomask being selectively permeable to the mixture of multiple inert immiscible liquids, wherein the patterned membrane photomask is further configured to control where polymerization occurs, and wherein the patterned membrane photomask comprises multiple different patterns configured to allow for selective exposure of the light emitted from the light source into the containment vessel;
a liquid monomer disposed in the inner volume of the containment vessel adjacent to a second surface of the patterned membrane photomask, the second surface of the patterned membrane photomask being opposite the first surface of the patterned membrane photomask that is immediately adjacent the mixture of multiple inert immiscible liquids,
wherein the mixture of multiple inert immiscible liquids is chemically inert to the liquid monomer,
wherein the multiple inert immiscible liquids in the mixture of multiple inert immiscible liquids are different than the liquid monomer; and
a carrier structure disposed within the inner volume of the containment vessel within the liquid monomer and a distance above the patterned membrane photomask, wherein the device is configured such that a first portion of the mixture of multiple inert immiscible liquids is communicated from the first surface of the patterned membrane photomask, through the patterned membrane photomask, to the second surface of the patterned membrane photomask to form a liquid monomer-inert immiscible liquid interface between the first surface of the patterned membrane photomask and the liquid monomer, wherein the device is configured such that a first instance of the polymerizing light emitted from the light source passes through the transparent solid boundary, through the patterned membrane photomask, through the mixture of multiple inert immiscible liquids, and causes or initiates polymerization of a first portion of the liquid monomer to form the one or more solid polymer layers of the 3D object at the liquid monomer-inert immiscible liquid interface formed between the liquid monomer and the mixture of multiple inert immiscible liquids, the one or more solid polymer layers of the 3D object being formed against and adhering to the carrier structure, and wherein the device is configured to, after the first one or more solid polymer layers of the 3D object are formed and adhere to the carrier structure, move the carrier structure an additional distance above the patterned membrane photomask, reconfigure the dynamically patterned membrane photomask according to a second photomask design associated with one or more second solid polymer layers of the 3D object allow a second portion of the mixture of multiple inert immiscible liquids to be communicated from the first surface of the patterned membrane photomask, through the patterned membrane photomask, to the second surface of the patterned membrane photomask at a location immediately adjacent a remaining portion of the liquid monomer to form a subsequent liquid monomer-inert immiscible liquid interface, and cause the light source to emit a second instance of the polymerizing light, causing the second instance of the polymerizing light pass through the transparent solid boundary, through the patterned membrane photomask, through the mixture of multiple inert immiscible liquids, and to cause or initiate polymerization of a second portion of the liquid monomer at the subsequent liquid monomer-inert immiscible liquid interface to form one or more second solid polymer layers of the 3D object against and adhering to one or both of the carrier structure or the first one or more solid polymer layers of the 3D object.

18. The device according to claim 17, wherein the mixture of multiple inert immiscible liquids is initially disposed between the transparent solid boundary and the liquid monomer within at least a portion of the containment vessel.

19. The device according to claim 17, wherein a density of each of the inert immiscible liquids in the mixture of multiple inert immiscible liquids is different than a density of the liquid monomer.

20. The device according to claim 19, wherein the transparent solid boundary comprises one or more of a liquid crystal display (LCD) or a light-emitting diode (LED).

21. The device according to claim 17, wherein polymerization of the first portion of the liquid monomer is spatially controlled so that the first portion of the liquid monomer is polymerized to form the first portion of the solid polymer based on one or more of: a pattern of the polymerizing light, a pattern of the patterned membrane photomask, a composition of the liquid monomer, or a composition of the mixture of multiple inert immiscible liquids.

22. The device according to claim 17, wherein the mixture of multiple inert immiscible liquids comprises one or more additives, and wherein the one or more additives are configured to modify polymerization of the liquid monomer or limit polymerization of the mixture of multiple inert immiscible liquids.

23. The device according to claim 17, wherein the mixture of multiple inert immiscible liquids comprises one or more additives, and wherein the one or more additives are incorporated into the first portion of the solid polymer when the first portion of the liquid monomer is polymerized to form the first portion of the solid polymer when exposed to the first instance of the polymerizing light emitted from the light source.

24. The device according to claim 17, wherein, once the first portion of the mixture of multiple inert immiscible liquids are communicated through the patterned membrane photomask, a gradient of miscibility forms at the liquid monomer-inert immiscible liquid interface between the liquid monomer and the first portion of the mixture of multiple inert immiscible liquids.

25. The device according to claim 17, wherein the mixture of multiple inert immiscible liquids comprises additives that are configured to modify properties of the mixture of multiple inert immiscible liquids and properties of the liquid monomer or the interaction between the mixture of multiple inert immiscible liquids and the liquid monomer.

26. The device according to claim 17, further comprising:
at least one inlet port defined in the containment vessel or the transparent solid boundary or at least one outlet port defined in the containment vessel or the transparent solid boundary, the at least one inlet port or the at least one outlet port being configured to allow communication of fluids into or out of the containment vessel of the device.

27. The device according to claim 17, further comprising:
a heater or a cooler disposed within or adjacent to the containment vessel, the heater or the cooler being configured to modify a temperature of fluids within the containment vessel of the device.

28. The device of claim 17, wherein the mixture of multiple inert immiscible liquids is initially confined within a groove or a recessed portion of the inner volume of the containment vessel.

29. The device of claim 17, wherein the mixture of multiple inert immiscible liquids comprises a stack of multiple inert immiscible liquids.

30. The device of claim 17, wherein the mixture of multiple inert immiscible liquids comprises one or more fluorinated solvents.

* * * * *